United States Patent
Oda et al.

(10) Patent No.: US 11,755,009 B2
(45) Date of Patent: Sep. 12, 2023

(54) TRANSPORT SYSTEM, TRANSPORT METHOD, AND PROGRAM

(71) Applicant: TOYOTA JIDOSHA KABUSHIKI KAISHA, Toyota Aichi-ken (JP)

(72) Inventors: Shiro Oda, Anjo Aichi-ken (JP); Tetsuya Taira, Nagakute Aichi-ken (JP); Satoshi Toyoshima, Okazaki Aichi-ken (JP); Yuta Watanabe, Toyota Aichi-ken (JP); Takeshi Matsui, Nisshin Aichi-ken (JP); Takayoshi Nasu, Okazaki Aichi-ken (JP); Kei Yoshikawa, Nagoya Aichi-ken (JP); Yusuke Ota, Nagakute Aichi-ken (JP); Yutaro Ishida, Toyota Aichi-ken (JP); Yuji Onuma, Nagoya Aichi-ken (JP); Kyosuke Arai, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 77 days.

(21) Appl. No.: 17/500,359

(22) Filed: Oct. 13, 2021

(65) Prior Publication Data
US 2022/0197275 A1 Jun. 23, 2022

(30) Foreign Application Priority Data
Dec. 22, 2020 (JP) .................................. 2020-212179

(51) Int. Cl.
*G07C 5/00* (2006.01)
*G05D 1/00* (2006.01)

(52) U.S. Cl.
CPC ......... *G05D 1/0027* (2013.01); *G05D 1/0022* (2013.01); *G05D 1/0088* (2013.01); *G07C 5/006* (2013.01); *G05D 2201/0216* (2013.01)

(58) Field of Classification Search
CPC .. G05D 1/0027; G05D 1/0022; G05D 1/0088; G05D 2201/0216; G07C 5/006
See application file for complete search history.

(56) References Cited

U.S. PATENT DOCUMENTS

| 10,308,430 B1 * | 6/2019 | Brady ................. G05D 1/0022 |
| 2019/0318549 A1 * | 10/2019 | Zeira .................... G07C 5/0808 |

FOREIGN PATENT DOCUMENTS

| JP | 2002-015073 A | 1/2002 |
| JP | 2012048563 A * | 3/2012 |

OTHER PUBLICATIONS

Machine Translation of Description of JP2002015073A (Year: 2023).*
(Continued)

*Primary Examiner* — Anne Marie Antonucci
*Assistant Examiner* — Jared C Bean
(74) *Attorney, Agent, or Firm* — Dinsmore & Shohl LLP

(57) ABSTRACT

A transport system transports a transported object using an autonomously moveable mobile robot. The transport system stores management information including a use start time, a use end time, and a use location for each equipment to be lent that is transported as the transported object by the mobile robot. The transport system executes a determination process for determining whether an interval from the use end time to a next use start time is equal to or longer than a predetermined time for each equipment based on the management information. The transport system transports the equipment to its storage location after an end of use of the equipment when the interval is equal to or longer than the predetermined time, and transports the equipment to a next use location of the equipment after the end of the use of the equipment when the interval is shorter than the predetermined time.

6 Claims, 12 Drawing Sheets

(56) References Cited

OTHER PUBLICATIONS

Machine Translation of Description of JP2012048563A (Year: 2023).*

* cited by examiner

FIG. 5

| LENDING MANAGEMENT NUMBER | EQUIPMENT MANAGEMENT NUMBER | NAME | NECESSITY OF MAINTENANCE | MAINTENANCE PERSONNEL TYPE | TRANSPORT DESTINATION (USE LOCATION) | PLANNED USER | USE START TIME | USE END TIME |
|---|---|---|---|---|---|---|---|---|
| 001 | E001 | BLOOD TRANSFUSION PUMP | ESSENTIAL | MA001 | G001 | U001 | 13:00 | 15:30 |
| 002 | E002 | SPHYGMOMANOMETER | OPTIONAL | MA002 | G001 | U002 | 13:50 | 14:00 |
| 003 | E001 | BLOOD TRANSFUSION PUMP | ESSENTIAL | MA001 | G002 | U004 | 16:00 | 18:30 |
| 004 | E002 | SPHYGMOMANOMETER | OPTIONAL | MA002 | G002 | U002 | 21:00 | 21:00 |
| 005 | E001 | BLOOD TRANSFUSION PUMP | ESSENTIAL | MA001 | G001 | U003 | 22:00 | 24:30 |
| ... | ... | ... | ... | ... | ... | ... | ... | ... |

FIG. 6

| TRANSPORT MANAGE-MENT NUMBER | EQUIPMENT MANAGE-MENT NUMBER | NAME | NECESSITY OF MAIN-TENANCE | MAIN-TENANCE PERSONNEL TYPE | TRANSPORT SOURCE | TRANSPORT DESTINATION | PLANNED USER | ROBOT ID | STATUS | USE START TIME | USE END TIME |
|---|---|---|---|---|---|---|---|---|---|---|---|
| 001 | E001 | BLOOD TRANSFUSION PUMP | ESSENTIAL | MA001 | S001 | G001 | U001 | AAA | POST-TRANSPORT | 13:00 | 15:30 |
| 002 | E002 | SPHYGMOMANOMETER | OPTIONAL | MA002 | S001 | G001 | U002 | BBB | TRANSPORT UNDER WAY | 13:50 | 14:00 |
| 003 | E001 | BLOOD TRANSFUSION PUMP | ESSENTIAL | MA001 | (S001→)G001 | G002 | U004 | AAA | PRE-TRANSPORT | 16:00 | 18:30 |
| 004 | E002 | SPHYGMOMANOMETER | OPTIONAL | MA002 | S001 | G002 | U002 | BBB | PRE-TRANSPORT | 21:00 | 21:00 |
| 005 | E001 | BLOOD TRANSFUSION PUMP | ESSENTIAL | MA001 | G002 | S001 | – | BBB | PRE-TRANSPORT | 19:00 | 19:00 |
| 006 | E001 | BLOOD TRANSFUSION PUMP | ESSENTIAL | MA001 | S001 | G001 | U003 | BBB | PRE-TRANSPORT | 22:00 | 24:30 |
| ... | ... | ... | ... | ... | ... | ... | ... | ... | ... | ... | ... |

TRANSPORT SYSTEM, TRANSPORT METHOD, AND PROGRAM

CROSS-REFERENCE TO RELATED APPLICATION

This application claims priority to Japanese Patent Application No. 2020-212179 filed on Dec. 22, 2020, incorporated herein by reference in its entirety.

BACKGROUND

1. Technical Field

The present disclosure relates to transport systems, transport methods, and programs.

2. Description of Related Art

Japanese Unexamined Patent Application Publication No. 2002-015073 (JP 2002-015073 A) discloses an equipment lending system that aims to efficiently lend equipment owned by a facility among a plurality of facilities, and that is provided with equipment information transmitting means, use reservation information receiving means, and lending information registration means. The equipment information transmitting means transmits equipment information of equipment owned by a plurality of facilities to the facilities via a communication line. The use reservation information receiving means receives the usage reservation information of the equipment to the facilities via a communication line. The lending information registration means registers lending information for lending the equipment to each other among the facilities based on the use reservation information.

SUMMARY

However, in the system described in JP 2002-015073 A, the schedule must be determined with a margin in accordance with the preparation time such as an hour, and the use reservation information must be registered based on the schedule, which makes it difficult to use the equipment efficiently. Therefore, when lending the equipment, it is desired that the equipment can be used efficiently.

The present disclosure is made to solve such an issue, and provides a transport system, a transport method, and a program that enable prompt usage of the equipment when lending the equipment, even when there is no time to spare before the next scheduled use time.

A transport system according to a first aspect of the present disclosure is a transport system for transporting a transported object using a mobile robot that is autonomously moveable. The transport system: stores management information including a use start time, a use end time, and a use location for each equipment to be lent that is transported as the transported object by the mobile robot; executes a determination process for determining whether an interval from the use end time to a next use start time is equal to or longer than a predetermined time for each equipment based on the management information; transports the equipment to a storage location of the equipment after an end of use of the equipment when the interval is equal to or longer than the predetermined time; and transports the equipment to a next use location of the equipment after the end of the use of the equipment when the interval is shorter than the predetermined time. With such a configuration, in the above transport system, when lending the equipment, the equipment can be used promptly even when there is no time to spare before the next scheduled use time.

In the above transport system, the predetermined time may be determined based on a moving time of the mobile robot from the use location to the storage location and a moving time of the mobile robot from the use location to the next use location. This makes it possible to lend the lending equipment appropriately and at a high operating rate.

The above transport system may notify contact information of a maintenance personnel who performs maintenance of the equipment of a transport destination of the equipment determined as a result of the determination process. With such a notification, the maintenance personnel can head to the transport destination of the equipment for maintenance as needed.

The above transport system may notify the contact information of the maintenance personnel of the transport destination and arrival time of the equipment, when the transport destination of the equipment is determined to be the next use location of the equipment as a result of the determination process. With such a notification, the maintenance personnel can head for maintenance as needed even when the transport destination is determined to be the next use location. Further, since the maintenance personnel can grasp the arrival time, the maintenance personnel does not have to wait at the transport destination, and by heading to the transport destination according to the arrival time, the maintenance personnel can perform the maintenance without being late for the next use start time.

The above transport system may notify the contact information of the maintenance personnel of the transport destination and arrival time of the equipment, when the transport destination of the equipment is determined to be the storage location of the equipment as a result of the determination process. With such a notification, the maintenance personnel can head for maintenance as needed even when the transport destination is determined to be the storage location. Further, since the maintenance personnel can grasp the arrival time, the maintenance personnel does not have to wait at the transport destination, and the maintenance can be performed collectively in consideration of the maintenance of other equipment.

The above transport system may notify contact information of a first maintenance personnel who performs maintenance of the equipment of the transport destination of the equipment, when the transport destination of the equipment is determined to be the storage location of the equipment as a result of the determination process, and may notify contact information of a second maintenance personnel who performs maintenance of the equipment and who is different from the first maintenance personnel of the transport destination of the equipment, when the transport destination of the equipment is determined to be the next use location of the equipment as a result of the determination process. With such a notification, the maintenance personnel of the equipment can be classified into the person in charge at the storage location and the person in charge at the next use location, and thus the right person in charge can be assigned at the right place. In particular, when the transport destination is determined to be the next use location, it is possible to notify personnel who can deal with sudden problems at the site, and when the transport destination is determined to be the storage location, it is possible to notify other personnel.

The above transport system may make a notification destination for the transport destination of the equipment determined as a result of the determination process different depending on a kind of the equipment. With such a notification, the maintenance personnel can be different depending on the skill level and expertise of maintenance of the equipment.

A transport method according to a second aspect of the present disclosure is a transport method for transporting a transported object using a mobile robot that is autonomously moveable. The transport method includes: storing management information including a use start time, a use end time, and a use location for each equipment to be lent that is transported as the transported object by the mobile robot; executing a determination process for determining whether an interval from the use end time to a next use start time is equal to or longer than a predetermined time for each equipment based on the management information; transporting the equipment to a storage location of the equipment after an end of use of the equipment when the interval is equal to or longer than the predetermined time; and transporting the equipment to a next use location of the equipment after the end of the use of the equipment when the interval is shorter than the predetermined time. With such a process, in the above transport method, when lending the equipment, the equipment can be used promptly even when there is no time to spare before the next scheduled use time.

In the above transport method, the predetermined time may be determined based on a moving time of the mobile robot from the use location to the storage location and a moving time of the mobile robot from the use location to the next use location. This makes it possible to lend the lending equipment appropriately and at a high operating rate.

The above transport method may include notifying contact information of a maintenance personnel who performs maintenance of the equipment of a transport destination of the equipment determined as a result of the determination process. With such a notification, the maintenance personnel can head to the transport destination of the equipment for maintenance as needed.

The above transport method may include notifying the contact information of the maintenance personnel of the transport destination and arrival time of the equipment, when the transport destination of the equipment is determined to be the next use location of the equipment as a result of the determination process. With such a notification, the maintenance personnel can head for maintenance as needed even when the transport destination is determined to be the next use location. Further, since the maintenance personnel can grasp the arrival time, the maintenance personnel does not have to wait at the transport destination, and by heading to the transport destination according to the arrival time, the maintenance personnel can perform the maintenance without being late for the next use start time.

The above transport method may include notifying the contact information of the maintenance personnel of the transport destination and arrival time of the equipment, when the transport destination of the equipment is determined to be the storage location of the equipment as a result of the determination process. With such a notification, the maintenance personnel can head for maintenance as needed even when the transport destination is determined to be the storage location. Further, since the maintenance personnel can grasp the arrival time, the maintenance personnel does not have to wait at the transport destination, and the maintenance can be performed collectively in consideration of the maintenance of other equipment.

The above transport method may include notifying contact information of a first maintenance personnel who performs maintenance of the equipment of the transport destination of the equipment, when the transport destination of the equipment is determined to be the storage location of the equipment as a result of the determination process, and notifying contact information of a second maintenance personnel who performs maintenance of the equipment and who is different from the first maintenance personnel of the transport destination of the equipment, when the transport destination of the equipment is determined to be the next use location of the equipment as a result of the determination process. With such a notification, the maintenance personnel of the equipment can be classified into the person in charge at the storage location and the person in charge at the next use location, and thus the right person in charge can be assigned at the right place. In particular, when the transport destination is determined to be the next use location, it is possible to notify personnel who can deal with sudden problems at the site, and when the transport destination is determined to be the storage location, it is possible to notify other personnel.

The above transport method may include making a notification destination for the transport destination of the equipment determined as a result of the determination process different depending on a kind of the equipment. With such a notification, the maintenance personnel can be different depending on the skill level and expertise of maintenance of the equipment.

The program according to a third aspect of the present disclosure is a program that causes a computer to execute transport management for transporting a transported object using a mobile robot that is autonomously moveable. The above transport management includes: storing management information including a use start time, a use end time, and a use location for each equipment to be lent that is transported as the transported object by the mobile robot; executing a determination process for determining whether an interval from the use end time to a next use start time is equal to or longer than a predetermined time for each equipment based on the management information; transporting the equipment to a storage location of the equipment after an end of use of the equipment when the interval is equal to or longer than the predetermined time; and transporting the equipment to a next use location of the equipment after the end of the use of the equipment when the interval is shorter than the predetermined time. With such a process, in the above program, when lending the equipment, the equipment can be used promptly even when there is no time to spare before the next scheduled use time.

In the above transport management, the predetermined time may be determined based on a moving time of the mobile robot from the use location to the storage location and a moving time of the mobile robot from the use location to the next use location. This makes it possible to lend the lending equipment appropriately and at a high operating rate.

The transport management may include a notification process for notifying contact information of a maintenance personnel who performs maintenance of the equipment of a transport destination of the equipment determined as a result of the determination process. With such a notification, the maintenance personnel can head to the transport destination of the equipment for maintenance as needed.

The notification process may notify the contact information of the maintenance personnel of the transport destination and arrival time of the equipment, when the transport destination of the equipment is determined to be the next use location of the equipment as a result of the determination process. With such a notification, the maintenance personnel can head for maintenance as needed even when the transport destination is determined to be the next use location. Further, since the maintenance personnel can grasp the arrival time, the maintenance personnel does not have to wait at the transport destination, and by heading to the transport destination according to the arrival time, the maintenance personnel can perform the maintenance without being late for the next use start time.

The notification process may notify the contact information of the maintenance personnel of the transport destination and arrival time of the equipment, when the transport destination of the equipment is determined to be the storage location of the equipment as a result of the determination process. With such a notification, the maintenance personnel can head for maintenance as needed even when the transport destination is determined to be the storage location. Further, since the maintenance personnel can grasp the arrival time, the maintenance personnel does not have to wait at the transport destination, and the maintenance can be performed collectively in consideration of the maintenance of other equipment.

The notification process may notify contact information of a first maintenance personnel who performs maintenance of the equipment of the transport destination of the equipment, when the transport destination of the equipment is determined to be the storage location of the equipment as a result of the determination process, and may notify contact information of a second maintenance personnel who performs maintenance of the equipment and who is different from the first maintenance personnel of the transport destination of the equipment, when the transport destination of the equipment is determined to be the next use location of the equipment as a result of the determination process. With such a notification, the maintenance personnel of the equipment can be classified into the person in charge at the storage location and the person in charge at the next use location, and thus the right person in charge can be assigned at the right place. In particular, when the transport destination is determined to be the next use location, it is possible to notify personnel who can deal with sudden problems at the site, and when the transport destination is determined to be the storage location, it is possible to notify other personnel.

The notification process may include making a notification destination for the transport destination of the equipment determined as a result of the determination process different depending on a kind of the equipment. With such a notification, the maintenance personnel can be different depending on the skill level and expertise of maintenance of the equipment.

According to the present disclosure, a transport system, a transport method, and a program can be provided that enable prompt usage of the equipment when lending the equipment, even when there is no time to spare before the next scheduled use time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a table showing an example of equipment lending information;

FIG. 6 is a table showing an example of transported object information;

DETAILED DESCRIPTION OF EMBODIMENTS

Hereinafter, the present disclosure will be described through embodiments of the disclosure, but the disclosure according to the scope of the claims is not limited to the following embodiments. Moreover, not all of the configurations described in the embodiments are indispensable for solving the problem.

Schematic Configuration

Figure 1:
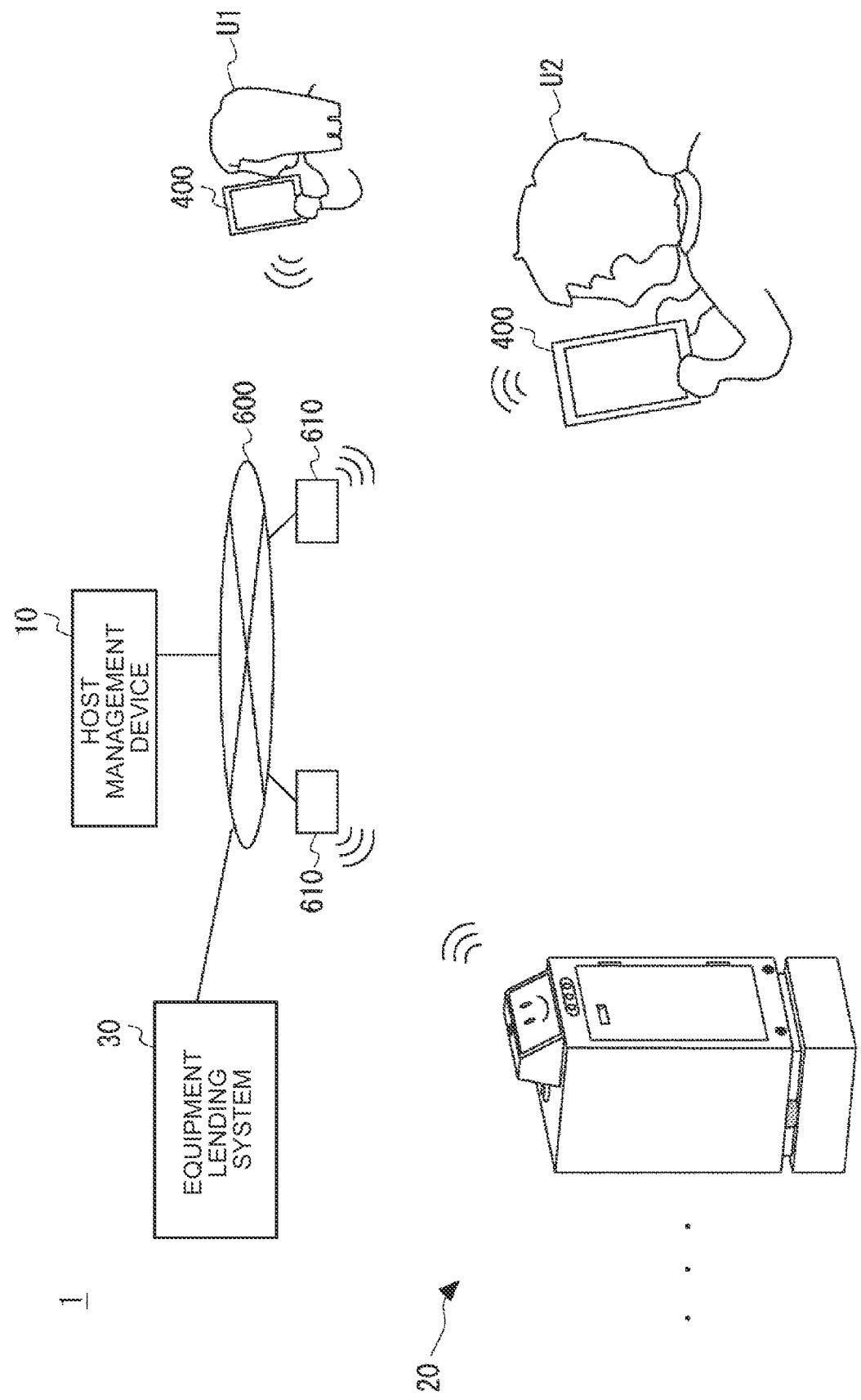
FIG. 1 is a conceptual diagram illustrating an overall configuration example of a system in which a mobile robot according to the present embodiment is used.

FIG. 1 is a conceptual diagram illustrating an overall configuration example of a transport system 1 in which a mobile robot 20 according to the present embodiment is used. The transport system 1 according to the present embodiment is a system for transporting a transported object by using a mobile robot capable of autonomous movement. Here, the mobile robot 20 as shown in FIG. 1 will be described as an example of the mobile robot.

In addition to the mobile robot 20, the transport system 1 includes a host management device 10, an equipment lending system 30, a network 600, a communication unit 610, and a user terminal 400.

The mobile robot 20 is a transport robot that executes transport of the transported object as a task. The mobile robot 20 autonomously travels in order to transport a transported object in a medical welfare facility such as a hospital, a rehabilitation center, a nursing facility, and an elderly care facility. The transport system 1 according to the present embodiment can also be used in a commercial facility such as a shopping mall.

A user U1 such as the user or the user's assistant of the transported object or the manager of the transported object requests the mobile robot 20 to transport the transported object. The user U1 stores the transported object in the mobile robot 20 at the location requested at the time of the transport request or at the receiving point (transport source) included in the information of the transport request. It goes without saying that storing the transported object can also be carried out by a storage robot or the like. As in the case of a mobile robot having another shape described later with reference to FIG. 11, the user U1 may load the transported object on the mobile robot with the transported object exposed to transport the transported object. However, for simplifying the description, it is assumed that the transported object is transported with the transported object stored in the mobile robot 20.

In particular, the present embodiment has one of the features of transporting the equipment to be lent (hereinafter referred to as lending equipment) as the transported object, and this point will be mainly described. It should be noted that the mobile robot 20 can also transport equipment other than lending equipment and objects to be transported other than equipment, such as medicines, consumables such as packaging bags, specimens, hospital food, and equipment such as stationery.

The user U1 can request the transport of the lending equipment according to the schedule for lending (lending schedule). As will be described later, this lending schedule can be managed by the equipment lending system 30, can be referred to by the user U1 for a transport request from the user terminal 400, and can also be referred to by the host management device 10.

The mobile robot 20 autonomously moves to the set destination to transport the lending equipment. That is, the mobile robot 20 executes a luggage transport task (hereinafter also simply referred to as a task). In the following description, the location where the lending equipment is loaded is referred to as a transport source, and the location where the lending equipment is delivered is referred to as a transport destination.

For example, it is assumed that the mobile robot 20 moves in a general hospital having a plurality of clinical departments. The mobile robot 20 transports the lending equipment between a plurality of clinical departments. For example, the mobile robot 20 delivers the lending equipment from a nurse station of one clinical department to a nurse station of another clinical department. Alternatively, the mobile robot 20 delivers the lending equipment from its storage to a nurse station of a clinical department. Further, when the transport destination is on a different floor, the mobile robot 20 may move using an elevator or the like.

Examples of the lending equipment include medical equipment such as inspection tools and medical tools. The medical equipment includes bed slip prevention devices, sphygmomanometers, drip devices such as blood transfusion pumps and syringe pumps, foot pumps, nurse call devices, bed leaving sensors, low-pressure continuous inhalers, electrocardiogram monitors, drug injection controllers, enteral nutrition pumps, artificial respirators, cuff pressure gauges, touch sensors, aspirators, nebulizers, pulse oximeters, artificial resuscitators, aseptic devices, echo machines, and the like. In addition to the above, the medical equipment includes various drip devices, various vital monitors, and the like. It should be noted that a plurality of models may be lent for each type of medical equipment, such as a case where blood transfusion pumps having different flow rates are lent.

Some lending equipment are provided with a stand. For example, such lending equipment with a stand includes, for example, a low-voltage continuous suction device, an echo machine, an electrocardiogram monitor (transmitter), an electrocardiogram monitor (central monitor), an electrocardiogram monitor (bedside monitor), a respirator, a nebulizer, and the like. Many lending equipment with a stand are operated by connecting to a commercial power source instead of using a battery, and are often stored in a storeroom as a storage location as compared with lending equipment without a stand.

In many cases, the lending equipment described above does not require sterilization of the main body, or only a part of the equipment needs to be disinfected, and some lending equipment is equipped with disposable tools. Catheters, surgical knives, scissors, and the like that require sterilization can also be handled as the lending equipment in the present embodiment when the storage location and the sterilization location are the same or are close to each other.

In the present embodiment, as shown in FIG. 1, the equipment lending system 30, the mobile robot 20, and the user terminal 400 are connected to the host management device 10 via the network 600. The mobile robot 20 and the user terminal 400 are connected to the network 600 via the communication unit 610. The network 600 is a wired or wireless local area network (LAN) or wide area network (WAN). The host management device 10 is connected to the network 600 by wire or wirelessly. The communication unit 610 is, for example, a wireless LAN unit installed in each environment. The communication unit 610 may be a general-purpose communication device such as a WiFi router.

The user terminal 400 is, for example, a tablet computer, a smartphone, or the like, and may be a stationary computer. The user terminal 400 only needs to be an information processing device capable of wireless or wired communication.

The user U1 or a user U2 can make a transport request using the user terminal 400. For example, the user U1 can access the equipment lending system 30 (via the host management device 10) from the user terminal 400 to refer to the schedule for a transport request, and make a transport request of the lending equipment to the host management device 10 based on the referenced result. The host management device 10 that has received this transport request can make a transport request to the mobile robot 20.

In this way, various signals transmitted from the user terminals 400 of the users U1 and U2 can be once sent to the host management device 10 via the network 600, and transmitted from the host management device 10 to the target mobile robots 20. Similarly, various signals transmitted from the mobile robot 20 are once sent to the host management device 10 via the network 600, and are transmitted from the host management device 10 to the target user terminal 400.

The host management device 10 is a server connected to each equipment, and collects data from each equipment. The host management device 10 is not limited to a physically single device, and may have a plurality of devices that perform distributed processing. Further, the host management device 10 may be distributedly provided in edge devices such as the mobile robot 20. For example, a part or all of the transport system 1 may be installed in the mobile robot 20.

The equipment lending system 30 is a system that manages the lending schedule (management information) indicating a lending date and time and a lending destination (use location, user, etc.) for each lending equipment. The equipment lending system 30 can be a server connected to the host management device 10, and exchanges data with the host management device 10. Thus, the host management device 10 can obtain the lending schedule of the lending equipment managed by the equipment lending system 30. The equipment lending system 30 may be distributedly provided in the host management device 10, or may be incorporated in the host management device 10.

The user terminal 400 and the mobile robot 20 may transmit and receive signals without passing through the host management device 10. For example, the user terminal 400 and the mobile robot 20 may directly transmit and receive signals by wireless communication. Alternatively, the user terminal 400 and the mobile robot 20 may transmit and receive signals via the communication unit 610.

The user U1 or the user U2 requests the transport of the lending equipment by using the user terminal 400. Hereinafter, description is made assuming that the user U1 is the transport requester at the transport source and the user U2 is the planned recipient at the transport destination (destination). Needless to say, the user U2 at the transport destination can also make a transport request. Further, a user who is located at a location other than the transport source or the transport destination may make a transport request.

When the user U1 makes a transport request, the user U1 inputs, using the user terminal 400, the content of the lending equipment, the receiving point of the lending equipment (hereinafter also referred to as the transport source), the delivery destination of the lending equipment (hereinafter also referred to as the transport destination), the estimated arrival time at the transport source (the receiving time of the lending equipment), the estimated arrival time at the transport destination (the transport deadline), and the like. Hereinafter, these types of information are also referred to as transport request information. In the case of the lending equipment to be transported in the present embodiment, the transport source may be the storage location of the lending equipment. The transport source may be a location where the user U1 is present. The transport destination is a location where the user U2 or a patient who is scheduled to use the lending equipment is present. The user U1 can input the transport request information by operating the touch panel of the user terminal 400.

Of the transport request information, the lending equipment can be designated by using the lending schedule registered in the equipment lending system 30. For example, the user U1 designates the lending equipment from the user terminal 400, loads the lending equipment on the mobile robot 20 as needed, and makes a transport request to the host management device 10. The host management device 10 that has received the transport request refers to the equipment lending system 30, determines the transport schedule so as to meet the use start time indicated by the lending schedule of the lending equipment, and makes a transport request to the mobile robot 20. Thus, the transport is carried out in accordance with the transport schedule.

Alternatively, the user U1 makes a transport request from the user terminal 400 while referring to the lending schedule, and the host management device 10 refers to the lending schedule to determine the transport schedule and makes a transport request to the mobile robot 20. Thus, the transport is carried out in accordance with the transport schedule. In addition to the above, various transport request methods can be adopted.

These examples are based on the premise that the transport request is made after the lending schedule is registered based on the transport request (request for lending registration). However, the lending equipment may be needed suddenly, and in that case, the lending schedule for the lending equipment at the required time is not registered. Even in such a case, the user U1 can also transmit the transport request from the user terminal 400 to the host management device 10. Based on this transport request, the host management device 10 refers to the equipment lending system 30 to check whether there is any overlap in the lending period, and when there is no problem, registers the lending schedule and makes the transport request to the mobile robot 20. In this case, the lending equipment can be loaded on the mobile robot 20 at a timing before or after transmitting the transport request from the user terminal 400, for example.

In either case, as described above, the user terminal 400 can transmit the transport request information input by the user U1 to the host management device 10. The host management device 10 is a management system that manages a plurality of mobile robots 20, and transmits an operation command for executing a transport task to each mobile robot 20. At this time, the host management device 10 determines the mobile robot 20 that executes the transport task for each transport request. Then, the host management device 10 transmits a control signal including an operation command to the mobile robot 20. The mobile robot 20 moves from the transport source so as to arrive at the transport destination in accordance with the operation command.

For example, the host management device 10 assigns a transport task to the mobile robot 20 at or near the transport source. Alternatively, the host management device 10 assigns a transport task to the mobile robot 20 heading toward the transport source or its vicinity. The mobile robot 20 to which the task is assigned goes to the transport source to pick up the lending equipment. Examples of the transport source include a storage location and a location where the user U1 who requested the task is located.

When the mobile robot 20 arrives at the transport source, the user U1 or another staff member loads the lending equipment on the mobile robot 20. The mobile robot 20 on which the lending equipment is loaded autonomously moves with the transport destination set as the destination. The host management device 10 transmits a signal to the user terminal 400 of the user U2 at the transport destination. Thus, the user U2 can know that the lending equipment is being transported and the estimated arrival time. When the mobile robot 20 arrives at the set transport destination, the user U2 can receive the lending equipment stored in the mobile robot 20. In this way, the mobile robot 20 executes the transport task.

In the overall configuration described above, each element of the transport system can be distributed to the mobile robot 20, the user terminal 400, the equipment lending system 30, and the host management device 10 to construct the transport system as a whole. Further, it is possible to collect substantial elements for realizing the transport of the lending equipment in a single device to construct the transport system. The host management device 10 controls one or more mobile robots 20.

Further, the host management device 10 and the equipment lending system 30 can be provided so as to be mutually accessible to an electronic medical record system (not shown). The electronic medical record system stores information on patients (also referred to as patient information). For example, when a medical worker such as a doctor or a nurse inputs the patient information using the user terminal 400, the patient information is stored in a memory of the electronic medical record system or the like. Further, the medical worker can view and update the patient information stored in the electronic medical record system through the user terminal 400.

The configuration can be such that the host management device 10 reads the medical condition and the operation schedule registered in the electronic medical record system, determines the equipment necessary for the above, and registers the lending of the lending equipment and other accessories in the equipment lending system 30.

Control Block Diagram

Figure 2:
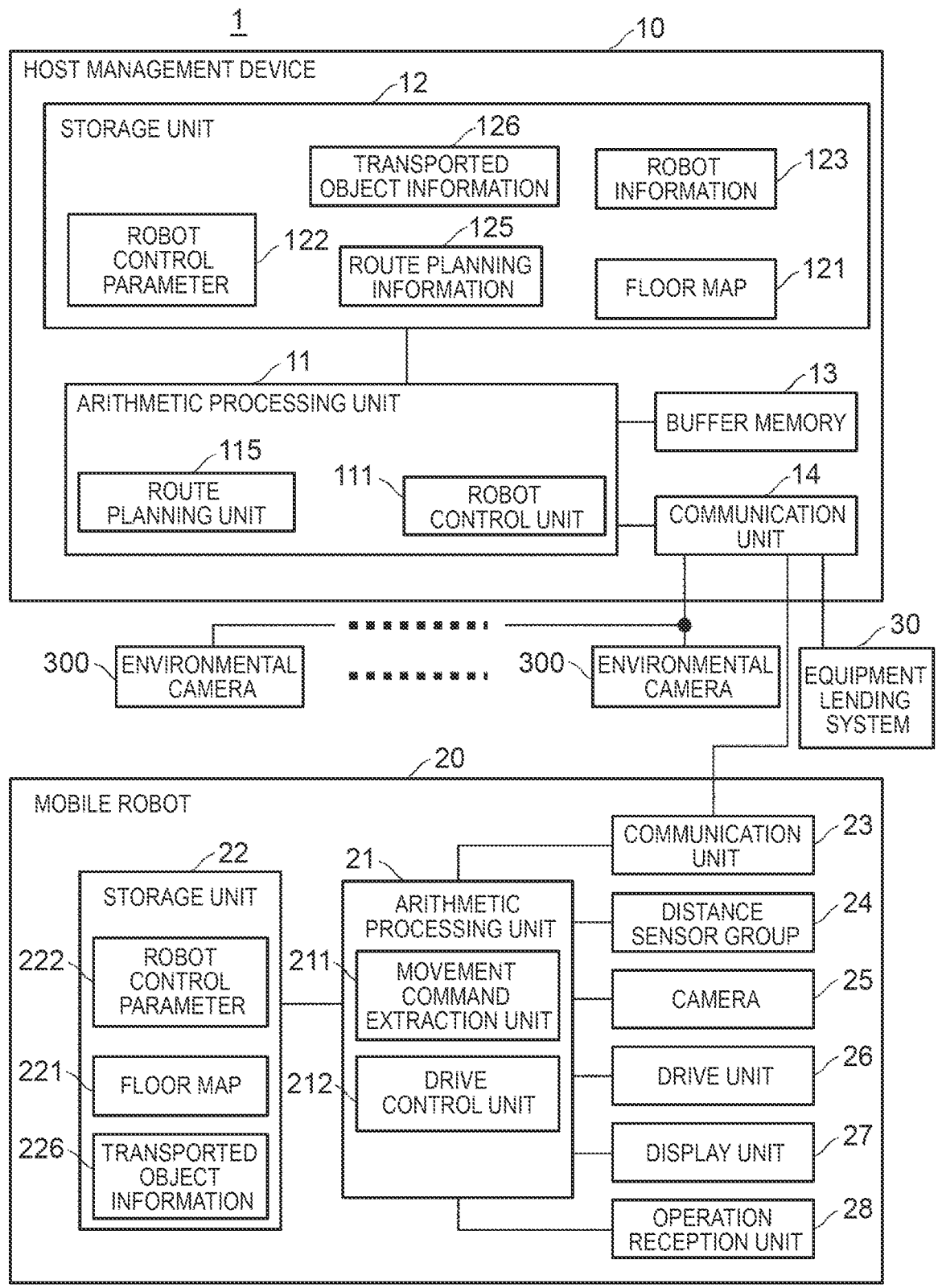
FIG. 2 is a control block diagram showing an example of a transport system according to the present embodiment.
Figure 3:
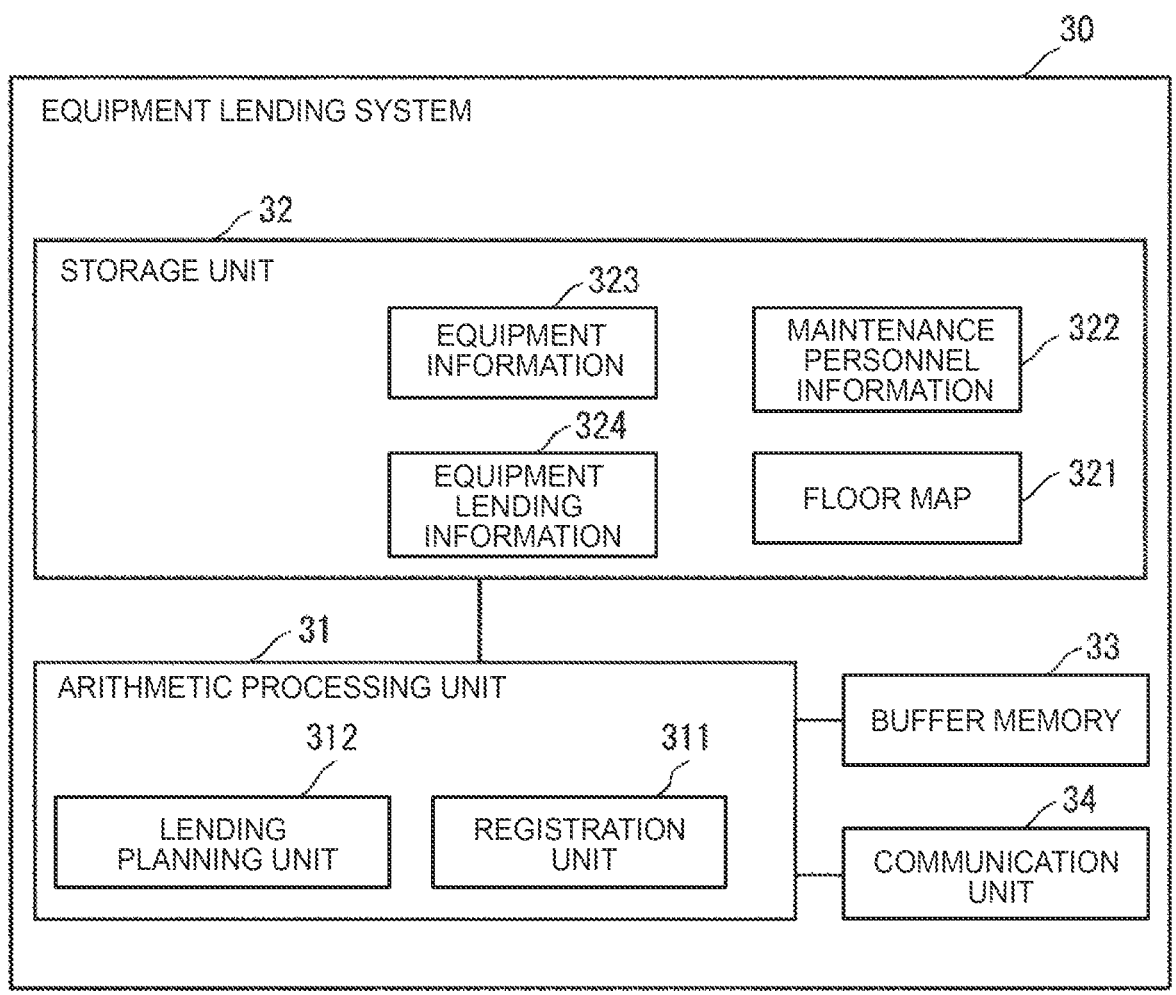
FIG. 3 is a control block diagram showing an example of an equipment lending system.

FIG. 2 is a control block diagram showing an example of a control system of the transport system 1, and FIG. 3 is a control block diagram showing an example of the equipment lending system 30 in the transport system 1 of FIGS. 1 and 2. As shown in FIG. 2, the transport system 1 can include the host management device 10, the mobile robot 20, the equipment lending system 30, and environmental cameras 300.

The transport system 1 efficiently controls a plurality of mobile robots 20 while causing the mobile robots 20 to autonomously move in a predetermined facility. Therefore, a plurality of environmental cameras 300 are installed in the facility. For example, the environmental camera 300 is installed in a passage, a hallway, an elevator, an entrance/exit, etc. in the facility.

The environmental cameras 300 acquire images of ranges in which the mobile robot 20 moves. In the transport system 1, the host management device 10 collects the images acquired by the environmental cameras 300 and the information based on the images. Alternatively, the images or the like acquired by the environmental cameras 300 may be directly transmitted to the mobile robots. The environmental cameras 300 may be surveillance cameras or the like provided in a passage or an entrance/exit in the facility. The environmental cameras 300 may be used to determine the distribution of congestion status in the facility.

In the transport system 1, the host management device 10 performs route planning based on the transport request information and generates route planning information. The route planning information can be generated as information for planning a transport route corresponding to the above-described transport schedule. The host management device 10 instructs a destination for each mobile robot 20 based on the generated route planning information. Then, the mobile robot 20 autonomously moves toward the destination designated by the host management device 10. The mobile robot 20 autonomously moves toward the destination using sensors, floor maps, position information, and the like provided in the mobile robot 20 itself.

For example, the mobile robot 20 travels so as not to come into contact with surrounding equipment, objects, walls, and people (hereinafter collectively referred to as peripheral objects). Specifically, the mobile robot 20 detects the distance from the peripheral object and travels while keeping a distance from the peripheral object by a certain distance (defined as a distance threshold value) or more. When the distance from the peripheral object becomes equal to or less than the distance threshold value, the mobile robot 20 decelerates or stops. In this way, the mobile robot 20 can travel without coming into contact with peripheral objects. Since contact can be avoided, safe and efficient transport is possible.

The host management device 10 can include an arithmetic processing unit 11, a storage unit 12, a buffer memory 13, and a communication unit 14. The arithmetic processing unit 11 performs arithmetic for controlling and managing the mobile robot 20. The arithmetic processing unit 11 can be implemented as a device capable of executing a program such as a central processing unit (CPU) of a computer, for example. Various functions can also be realized by a program. Only a robot control unit 111 and a route planning unit 115, which are characteristics of the arithmetic processing unit 11, are shown in FIG. 2, but other processing blocks can also be provided.

The robot control unit 111 performs arithmetic for remotely controlling the mobile robot 20 and generates a control signal. The robot control unit 111 generates a control signal based on route planning information 125 and the like, which will be described later. Further, the robot control unit 111 generates a control signal based on various types of information obtained from the environmental cameras 300 and the mobile robots 20. The control signal may include update information such as a floor map 121, robot information 123, and a robot control parameter 122, which will be described later. That is, when various types of information are updated, the robot control unit 111 generates a control signal according to the updated information.

The route planning unit 115 performs route planning for each mobile robot 20. When the transport task is input, the route planning unit 115 performs route planning for transporting the lending equipment to the transport destination (destination) based on the transport request information. Specifically, the route planning unit 115 refers to the route planning information 125, the robot information 123, and the like already stored in the storage unit 12 to determine the mobile robot 20 that executes a new transport task. The starting point is the current position of the mobile robot 20, the transport destination of the immediately preceding transport task, the receiving point of the lending equipment, and the like. The destination is the transport destination of the lending equipment, but may be a standby location, a charging location, or the like.

Here, the route planning unit 115 sets passing points from the starting point to the destination of the mobile robot 20. The route planning unit 115 sets the passing order of the passing points for each mobile robot 20. The passing points are set, for example, at branch points, intersections, lobbies in front of elevators, and their surroundings. In a narrow passage, it may be difficult for the mobile robots 20 to pass each other. In such a case, the passing point may be set at a location before the narrow passage. Candidates for the passing points may be registered in the floor map 121 in advance.

The route planning unit 115 determines the mobile robot 20 that performs each transport task from among the plurality of mobile robots 20 so that the task can be efficiently executed as the whole system. The route planning unit 115 preferentially assigns the transport task to the mobile robot 20 at standby or the mobile robot 20 located near the transport source.

The route planning unit 115 sets the passing points including a starting point and a destination for the mobile robot 20 to which the transport task is assigned. For example, when there are two or more movement routes from the transport source to the transport destination, the passing points are set so that the movement can be performed in a shorter time. Thus, the host management device 10 updates the information indicating the congestion status of the passages based on the images of the camera or the like. Specifically, locations where other mobile robots 20 are passing and locations where there are many people have a high degree of congestion. Therefore, the route planning unit 115 sets the passing points so as to avoid locations with a high degree of congestion.

The mobile robot 20 may be able to move to the destination by either a counterclockwise movement route or a clockwise movement route. In such a case, the route planning unit 115 sets the passing points so as to pass through the less congested movement route. The route planning unit 115 sets one or more passing points to the destination, so that the mobile robot 20 can move along a movement route that is not congested. For example, when a passage is divided at a branch point or an intersection, the route planning unit 115 sets a passing point at the branch point, the intersection, the corner, and the surroundings as appropriate. Thereby, the transport efficiency can be improved.

The route planning unit 115 may set the passing points in consideration of the congestion status of the elevator, the moving distance, and the like. Further, the host management device 10 may estimate the number of mobile robots 20 and the number of people at the estimated time when the mobile robot 20 passes through a certain location. Then, the route planning unit 115 may set the passing points in accordance with the estimated congestion status. Further, the route planning unit 115 may dynamically change the passing points in accordance with a change in the congestion status. The route planning unit 115 sets the passing points in order for the mobile robot 20 to which the transport task is assigned. The passing points may include the transport source and the transport destination. As will be described later, the mobile robot 20 autonomously moves so as to sequentially pass through the passing points set by the route planning unit 115.

The storage unit 12 is a storage unit that stores information necessary for managing and controlling the robot. In the example of FIG. 2, the floor map 121, the robot information 123, the robot control parameter 122, the route planning information 125, and transported object information 126 are shown, but the information stored in the storage unit 12 may include other information. The arithmetic processing unit 11 performs arithmetic using the information stored in the storage unit 12 when performing various processing. Further, various types of information stored in the storage unit 12 can be updated to the latest information.

The floor map 121 is map information of a facility in which the mobile robot 20 moves. The floor map 121 may be created in advance, may be generated from information obtained from the mobile robot 20, or may be information obtained by adding map correction information, which is generated from information obtained from the mobile robot 20, to a basic map created in advance.

The robot information 123 indicates the ID, model number, specifications, and the like of the mobile robot 20 managed by the host management device 10. The robot information 123 may include position information indicating the current position of the mobile robot 20. The robot information 123 may include information on whether the mobile robot 20 is executing a task or at standby. Further, the robot information 123 may include information indicating whether the mobile robot 20 is operating, out of order, or the like. Furthermore, the robot information 123 may include information on the lending equipment that can be transported and the lending equipment that cannot be transported.

The robot control parameter 122 indicates control parameters such as a threshold distance from a peripheral object for the mobile robot 20 managed by the host management device 10. The threshold distance is a margin distance for avoiding contact with the peripheral objects including a person. Further, the robot control parameter 122 may include information on the operating intensity such as the speed upper limit value of the moving speed of the mobile robot 20.

The robot control parameter 122 may be updated depending on the situation. The robot control parameter 122 may include information indicating the availability and usage status of the storage space of a storage 291 described later. The robot control parameter 122 may include information on a lending equipment that can be transported and a lending equipment that cannot be transported. It goes without saying that the robot control parameter 122 can also include information indicating whether the transported object other than the lending equipment can be transported. The robot control parameter 122 is associated with the above-described various types of information for each mobile robot 20.

The route planning information 125 includes the route planning information planned by the route planning unit 115. The route planning information 125 includes, for example, information indicating a transport task. The route planning information 125 may include the ID of the mobile robot 20 to which the task is assigned, the starting point, the content of the lending equipment, the transport destination, the transport source, the estimated arrival time at the transport destination, the estimated arrival time at the transport source, the arrival deadline, and the like. In the route planning information 125, the various types of information described above may be associated with each transport task. The route planning information 125 may include at least a part of the transport request information input from the user U1.

Further, the route planning information 125 may include information on the passing points for each mobile robot 20 and each transport task. For example, the route planning information 125 includes information indicating the passing order of the passing points for each mobile robot 20. The route planning information 125 may include the coordinates of each passing point on the floor map 121 and information on whether the mobile robot 20 has passed the passing point.

The transported object information 126 is information on the lending equipment for which the transport request has been made. For example, the transported object information 126 includes information such as the content (type) of the lending equipment, the transport source, and the transport destination. It goes without saying that the transported object information 126 may include information on the transported object other than the lending equipment, and the same applies to cases other than the transported object information 126 in the following description. The transported object information 126 may include the ID of the mobile robot 20 in charge of the transport. Further, the transported object information 126 may include information indicating the status such as transport under way, pre-transport (before loading), and post-transport. The transported object information 126 is associated with these types of information for each lending equipment. The transported object information 126 will be described later.

The route planning unit 115 refers to various types of information stored in the storage unit 12 to formulate a route plan. For example, the route planning unit 115 determines the mobile robot 20 that executes the task, based on the floor map 121, the robot information 123, the robot control parameter 122, and the route planning information 125. Then, the route planning unit 115 refers to the floor map 121 and the like to set the passing points to the transport destination and the passing order thereof. Candidates for the passing points are registered in the floor map 121 in advance. The route planning unit 115 sets the passing points in accordance with the congestion status and the like. In the case of continuous processing of tasks, the route planning unit 115 may set the transport source and the transport destination as the passing points.

Two or more mobile robots 20 may be assigned to one transport task. For example, when the lending equipment is larger than the transportable capacity of the mobile robot 20, one lending equipment is divided into two and loaded on the two mobile robots 20. Alternatively, when the lending equipment is heavier than the transportable weight of the mobile robot 20, one lending equipment is divided into two and loaded on the two mobile robots 20. In this way, one transport task can be shared and executed by two or more mobile robots 20. It goes without saying that, when controlling mobile robots 20 of different sizes, route planning may be performed so that the mobile robot 20 capable of transporting the lending equipment receives the lending equipment.

Further, one mobile robot 20 may perform two or more transport tasks in parallel. For example, one mobile robot 20 may simultaneously load two or more lending equipment and sequentially transport them to different transport destinations. Alternatively, while one mobile robot 20 is transporting one lending equipment, another lending equipment may be loaded on the mobile robot 20. Furthermore, the transport destinations of the lending equipment loaded at different locations may be the same or different. In this way, the task can be executed efficiently.

In such a case, storage information indicating the usage status or the availability of the storage space of the mobile robot 20 may be updated. That is, the host management device 10 may manage the storage information indicating the availability and control the mobile robot 20. For example, the storage information is updated when the lending equipment is loaded or received. When the transport task is input, the host management device 10 refers to the storage information and directs the mobile robot 20 having room for loading the lending equipment to receive the lending equipment. In this way, one mobile robot 20 can execute a plurality of transport tasks at the same time, and two or more mobile robots 20 can share and execute the transport tasks. For example, a sensor may be installed in the storage space of the mobile robot 20 to detect the availability. Further, the capacity and weight of each lending equipment may be registered in advance.

The buffer memory 13 is a memory that stores intermediate information generated in the processing of the arithmetic processing unit 11. The communication unit 14 is a communication interface for communicating with a plurality of environmental cameras 300 and at least one mobile robot 20 provided in the facility where the transport system 1 is operated. The communication unit 14 can perform both wired communication and wireless communication. For example, the communication unit 14 transmits a control signal necessary for controlling the mobile robot 20 to each mobile robot 20. The communication unit 14 receives the information collected by the mobile robot 20 and the environmental cameras 300. Further, the communication unit 14 can receive information such as the lending schedule from the equipment lending system 30 and can transmit information such as the lending schedule to the equipment lending system 30 for registration.

The mobile robot 20 can include an arithmetic processing unit 21, a storage unit 22, a communication unit 23, a proximity sensor (for example, a distance sensor group 24), a camera 25, a drive unit 26, a display unit 27, and an operation reception unit 28. Although FIG. 2 shows only typical processing blocks provided in the mobile robot 20, the mobile robot 20 also includes many other processing blocks that are not shown.

The communication unit 23 is a communication interface for communicating with the communication unit 14 of the host management device 10. The communication unit 23 communicates with the communication unit 14 using, for example, a wireless signal. The distance sensor group 24 is, for example, a proximity sensor, and outputs proximity object distance information indicating a distance from an object or a person that is present around the mobile robot 20. The camera 25, for example, captures an image for grasping the surrounding situation of the mobile robot 20. The camera 25 can also capture an image of a position marker provided on the ceiling or the like of the facility, for example. The mobile robot 20 may be made to grasp the position of the mobile robot 20 itself by using this position marker.

The drive unit 26 drives drive wheels provided on the mobile robot 20. The drive unit 26 may include an encoder or the like that detects the number of rotations of the drive wheels and the drive motor thereof. The position of the mobile robot 20 (current position) may be estimated based on the output of the encoder. The mobile robot 20 detects its current position and transmits the information to the host management device 10.

The display unit 27 and the operation reception unit 28 are realized by a touch panel display. The display unit 27 displays a user interface screen that serves as the operation reception unit 28. Further, the display unit 27 may display information indicating the destination of the mobile robot 20 and the state of the mobile robot 20. The operation reception unit 28 receives an operation from the user. The operation reception unit 28 includes various switches provided on the mobile robot 20 in addition to the user interface screen displayed on the display unit 27.

The arithmetic processing unit 21 performs arithmetic used for controlling the mobile robot 20. The arithmetic processing unit 21 can be implemented as a device capable of executing a program such as a CPU of a computer, for example. Various functions can also be realized by a program. The arithmetic processing unit 21 includes a movement command extraction unit 211 and a drive control unit 212. Although FIG. 2 shows only typical processing blocks included in the arithmetic processing unit 21, the arithmetic processing unit 21 includes processing blocks that are not shown. The arithmetic processing unit 21 may search for a route between passing points.

The movement command extraction unit 211 extracts a movement command from the control signal given by the host management device 10. For example, the movement command includes information on the next passing point. For example, the control signal may include information on the coordinates of the passing points and the passing order of the passing points. The movement command extraction unit 211 extracts these types of information as a movement command.

Further, the movement command may include information indicating that the movement to the next passing point has become possible. When the passage width is narrow, the mobile robots 20 may not be able to pass each other. There are also cases where the passage cannot be used temporarily. In such a case, the control signal includes a command to stop the mobile robot 20 at a passing point before the location at which the mobile robot 20 should stop. After the other mobile robot 20 has passed or after the passage has become passable, the host management device 10 outputs a control signal informing the mobile robot 20 that the mobile robot 20 has become movable. Thus, the mobile robot 20 that has been temporarily stopped resumes movement.

The drive control unit 212 controls the drive unit 26 so that the drive unit 26 moves the mobile robot 20 based on the movement command given from the movement command extraction unit 211. For example, the drive unit 26 has drive wheels that rotate according to a control command value from the drive control unit 212. The movement command extraction unit 211 extracts the movement command so that the mobile robot 20 moves toward the passing point received from the host management device 10. The drive unit 26 rotationally drives the drive wheels. The mobile robot 20 autonomously moves toward the next passing point. In this way, the mobile robot 20 sequentially passes the passing points so as to arrive at the transport destination. Further, the mobile robot 20 may estimate its position and transmit a signal indicating that the mobile robot 20 has passed the passing point to the host management device 10. Thus, the host management device 10 can manage the current position and the transport status of each mobile robot 20.

The storage unit 22 stores a floor map 221, a robot control parameter 222, and transported object information 226. Although FIG. 2 shows only a part of the information stored in the storage unit 22, the storage unit 22 also includes information other than the floor map 221, the robot control parameter 222, and the transported object information 226 shown in FIG. 2. The floor map 221 is map information of a facility in which the mobile robot 20 moves. The floor map 221 is, for example, data obtained by downloading apart or all of the floor map 121 of the host management device 10. The floor map 221 may be created in advance. Further, the floor map 221 may not be the map information of the entire facility but may be the map information including a part of the area in which the mobile robot 20 is planned to move.

The robot control parameter 222 is a parameter for operating the mobile robot 20. The robot control parameter 222 includes, for example, a distance threshold value from a peripheral object. The robot control parameter 222 also includes a speed upper limit value of the mobile robot 20.

The transported object information 226 includes information on the lending equipment, similarly to the transported object information 126. The transported object information 226 can include information such as the content (type, that is, model) of the lending equipment, the transport source, and the transport destination. The transported object information 226 may include information indicating the status such as transport under way, pre-transport (before loading), and post-transport. The transported object information 226 is associated with these types of information for each lending equipment. The transported object information 226 only needs to include information on the lending equipment transported by the mobile robot 20. Therefore, the transported object information 226 is a part of the transported object information 126. That is, the transported object information 226 does not have to include the information on the transport performed by other mobile robots 20. The transported object information 126 will be described later.

The drive control unit 212 refers to the robot control parameter 222 and stops or decelerates the operation in response to the fact that the distance indicated by the distance information obtained from the distance sensor group 24 has fallen below the distance threshold value. The drive control unit 212 controls the drive unit 26 so that the mobile robot 20 travels at a speed equal to or lower than the speed upper limit value. The drive control unit 212 limits the rotation speed of the drive wheels so that the mobile robot 20 does not move at a speed equal to or higher than the speed upper limit value.

As shown in FIG. 3, the equipment lending system 30 can include an arithmetic processing unit 31, a storage unit 32, a buffer memory 33, and a communication unit 34. The arithmetic processing unit 31 performs arithmetic for generating and managing a schedule of the lending equipment. The arithmetic processing unit 31 can be implemented as a device capable of executing a program such as a CPU of a computer, for example. Various functions can also be realized by a program. FIG. 3 shows only a registration unit 311 and a lending planning unit 312, which are characteristics of the arithmetic processing unit 31, but other processing blocks can also be provided.

The registration unit 311 receives via the communication unit 34 lending request information including the ID of the lending equipment, the use start time, the use end time, and the use location, which is transmitted from the user terminal 400 based on the operation by the user U1, and accepts registration.

The lending planning unit 312 refers to the equipment lending information 324 indicating the lending schedule that is already planned and other lending request information requested at the same time, based on the lending request information received by the registration unit 311 to confirm that there is no overlap. When there is no overlap, the lending planning unit 312 generates a lending schedule of the lending equipment based on the received lending request information, and updates the equipment lending information 324. When the lending request information received by the registration unit 311 has an overlap in terms of time (including the transport time) with the existing lending schedule or other lending request information of a request made at the same time, the lending planning unit 312 makes the following reply. That is, the lending planning unit 312 returns a notification on the overlap to the transmission source (user terminal 400 or host management device 10) of the lending request information via the communication unit 34.

The storage unit 32 is a storage unit that stores information necessary for lending management of the lending equipment and control of the equipment lending system 30. The example of FIG. 3 shows a floor map 321, maintenance personnel information 322, equipment information 323, and the equipment lending information 324, but the information stored in the storage unit 32 may include other information. The arithmetic processing unit 31 performs arithmetic using the information stored in the storage unit 32 when performing various processing. Further, various types of information stored in the storage unit 32 can be updated to the latest information.

The equipment information 323 is information indicating the ID, model (model number), size, weight, etc. of the lending equipment, and can include information indicating the time required for maintenance and the storage location. A part or all of the equipment information 323 can be registered in the host management device 10 as a part of the transported object information 126. The maintenance personnel information 322 is information associated with each lending equipment indicated by the equipment information 323, and can include information indicating a maintenance personnel who performs maintenance of each lending equipment (information indicating the maintenance personnel's ID or type of maintenance personnel, etc.) and information indicating the notification destination to each maintenance personnel. As will be described later, the maintenance personnel information 322 is stored in order to notify the maintenance personnel of the maintenance in the case where the maintenance of the lending equipment is performed after the end of the lending and before the next lending.

The floor map 321 can be a part or all of the floor map 121. The equipment lending information 324 is information indicating the lending schedule for each lending equipment generated by the lending planning unit 312. The equipment lending information 324 will be described later.

The buffer memory 33 is a memory that stores intermediate information generated in the processing of the arithmetic processing unit 31. The communication unit 34 is a communication interface for communicating with the host management device 10, and this communication interface can also be configured to communicate with the user terminal 400 and the mobile robots 20. The communication unit 34 can perform both wired communication and wireless communication. For example, the communication unit 34 can transmit information such as the lending schedule to the host management device 10 and receive information such as the lending schedule from the host management device 10 or the user terminal 400.

Configuration of Mobile Robot 20

Figure 4:
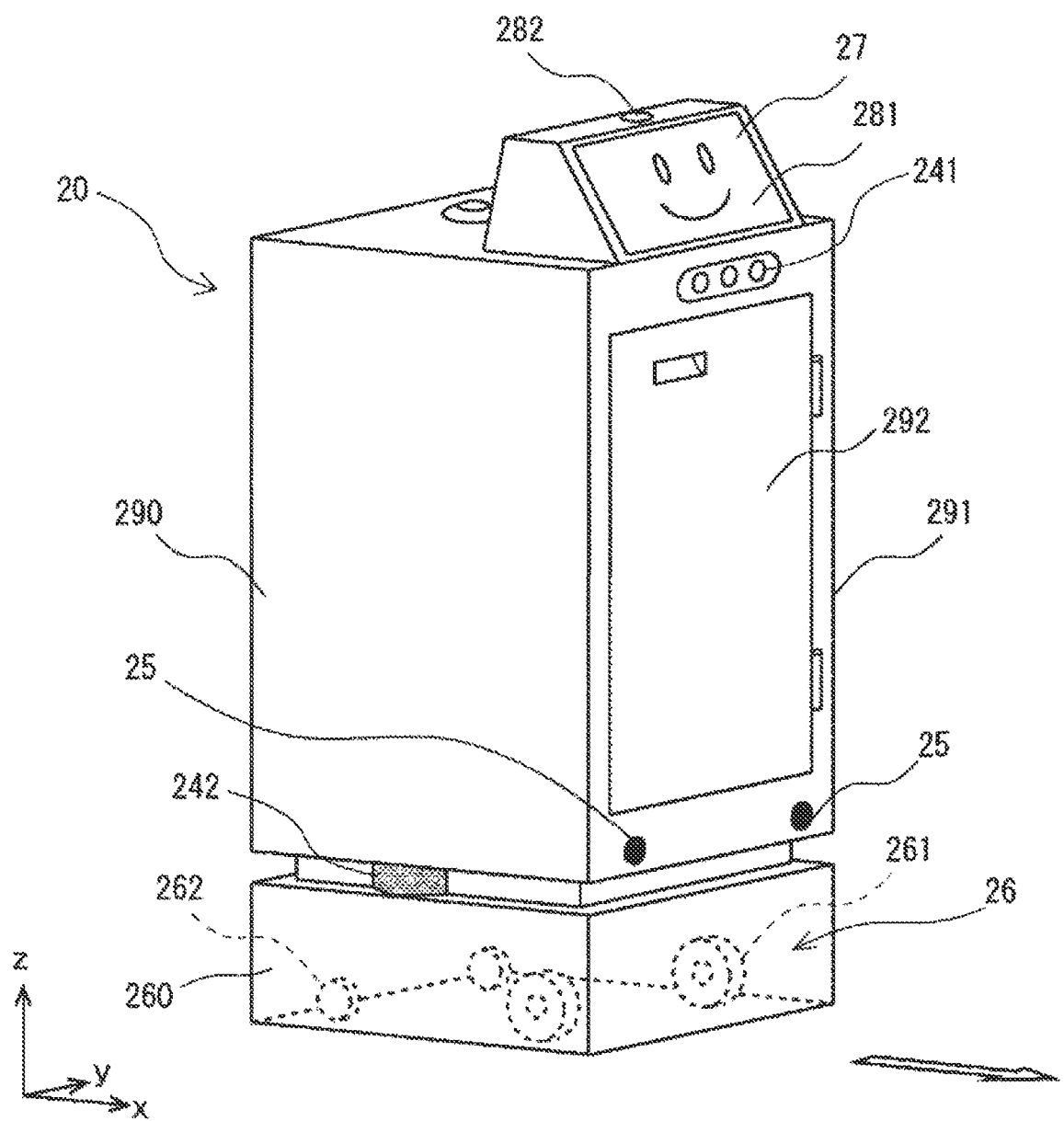
FIG. 4 is a schematic view showing an example of the mobile robot.

Here, the appearance of the mobile robot 20 will be described. FIG. 4 shows a schematic view of the mobile robot 20. The mobile robot 20 shown in FIG. 4 is one of the modes of the mobile robot 20, and may be in another form. In FIG. 4, the x direction is the forward and backward directions of the mobile robot 20, the y direction is the right-left direction of the mobile robot 20, and the z direction is the height direction of the mobile robot 20.

The mobile robot 20 includes a main body portion 290 and a carriage portion 260. The main body portion 290 is installed on the carriage portion 260. The main body portion 290 and the carriage portion 260 each have a rectangular parallelepiped housing, and each component is installed inside the housing. For example, the drive unit 26 is housed inside the carriage portion 260.

The main body portion 290 is provided with the storage 291 that serves as a storage space and a door 292 that seals the storage 291. The storage 291 is provided with a plurality of shelves, and the availability is managed for each shelf. For example, by providing various sensors such as a weight sensor in each shelf, the availability can be updated. The mobile robot 20 moves autonomously to transport the lending equipment stored in the storage 291 to the destination instructed by the host management device 10. The main body portion 290 may include a control box or the like (not shown) in the housing. Further, the door 292 may be able to be locked with an electronic key or the like. Upon arriving at the transport destination, the user U2 unlocks the door 292 with the electronic key. Alternatively, the door 292 may be automatically unlocked when the mobile robot 20 arrives at the transport destination.

As shown in FIG. 4, front-rear distance sensors 241 and right-left distance sensors 242 are provided as the distance sensor group 24 on the exterior of the mobile robot 20. The mobile robot 20 measures the distance of the peripheral objects in the front-rear direction of the mobile robot 20 by the front-rear distance sensors 241. The mobile robot 20 measures the distance of the peripheral objects in the right-left direction of the mobile robot 20 by the right-left distance sensors 242.

For example, the front-rear distance sensor 241 is provided on the front surface and the rear surface of the housing of the main body portion 290. The right-left distance sensor 242 is provided on the left side surface and the right side surface of the housing of the main body portion 290. The front-rear distance sensors 241 and the right-left distance sensors 242 are, for example, ultrasonic distance sensors and laser rangefinders. The front-rear distance sensors 241 and the right-left distance sensors 242 detect the distance from the peripheral objects. When the distance from the peripheral object detected by the front-rear distance sensor 241 or the right-left distance sensor 242 is equal to or less than the distance threshold value, the mobile robot 20 decelerates or stops.

The drive unit 26 is provided with drive wheels 261 and casters 262. The drive wheels 261 are wheels for moving the mobile robot 20 frontward, rearward, rightward, and leftward. The casters 262 are driven wheels that roll following the drive wheels 261 without being given a driving force. The drive unit 26 has a drive motor (not shown) and drives the drive wheels 261.

For example, the drive unit 26 supports, in the housing, two drive wheels 261 and two casters 262, each of which are in contact with the traveling surface. The two drive wheels 261 are arranged so that their rotation axes coincide with each other. Each drive wheel 261 is independently rotationally driven by a motor (not shown). The drive wheels 261 rotate according to a control command value from the drive control unit 212 of FIG. 2. The casters 262 are driven wheels that are provided so that a pivot axis extending in the vertical direction from the drive unit 26 supports the wheels at a position away from the rotation axis of the wheels, and thus follow the movement direction of the drive unit 26.

For example, when the two drive wheels 261 are rotated in the same direction at the same rotation speed, the mobile robot 20 travels straight, and when the two drive wheels 261 are rotated at the same rotation speed in the opposite directions, the mobile robot 20 pivots around the vertical axis extending through approximately the center of the two drive wheels 261. Further, by rotating the two drive wheels 261 in the same direction and at different rotation speeds, the mobile robot 20 can proceed while turning right and left. For example, by making the rotation speed of the left drive wheel 261 higher than the rotation speed of the right drive wheel 261, the mobile robot 20 can make a right turn. In contrast, by making the rotation speed of the right drive wheel 261 higher than the rotation speed of the left drive wheel 261, the mobile robot 20 can make a left turn. That is, the mobile robot 20 can travel straight, pivot, turn right and left, etc. in any direction by controlling the rotation direction and the rotation speed of each of the two drive wheels 261.

Further, in the mobile robot 20, the display unit 27 and an operation interface 281 are provided on the upper surface of the main body portion 290. The operation interface 281 is displayed on the display unit 27. When the user touch-operates the operation interface 281 displayed on the display unit 27, the operation reception unit 28 can receive an instruction input from the user. An emergency stop button 282 is provided on the upper surface of the display unit 27. The emergency stop button 282 and the operation interface 281 function as the operation reception unit 28.

The display unit 27 is, for example, a liquid crystal panel, which displays a character's face as an illustration or presents information on the mobile robot 20 in text or with an icon. By displaying a character's face on the display unit 27, it is possible to give surrounding observers the impression that the display unit 27 is a pseudo face portion. It is also possible to use the display unit 27 or the like installed in the mobile robot 20 as the user terminal 400.

The cameras 25 are installed on the front surface of the main body portion 290. Here, the two cameras 25 function as stereo cameras. That is, the two cameras 25 having the same angle of view are provided so as to be horizontally separated from each other. An image captured by each camera 25 is output as image data. It is possible to calculate the distance from the subject and the size of the subject based on the image data of the two cameras 25. The arithmetic processing unit 21 can detect a person, an obstacle, or the like at positions forward in the movement direction by analyzing the images of the cameras 25. When there are people or obstacles at positions forward in the traveling direction, the mobile robot 20 moves along the route while avoiding the people or the obstacles. The image data of the cameras 25 is transmitted to the host management device 10.

The mobile robot 20 recognizes the peripheral objects and identifies the position of the mobile robot 20 itself by analyzing the image data output by the cameras 25 and the detection signals output by the front-rear distance sensors 241 and the right-left distance sensors 242. The cameras 25 capture images of the front of the mobile robot 20 in the traveling direction. As shown in FIG. 4, the mobile robot 20 considers the side on which the cameras 25 are installed as the front of the mobile robot 20. That is, during normal movement, the traveling direction is the forward direction of the mobile robot 20 as shown by the arrow.

Main Features of Present Embodiment

Next, the main features of the present embodiment in the transport system 1 having the above-described configuration will be described. The present embodiment has a main feature in determining a transport schedule based on the lending schedule of the lending equipment and transporting the lending equipment based on the determination.

First, as described above, the transport system 1 according to the present embodiment stores (registers) the management information including the lending schedule (including the use start time and the use end time) and the use location of each lending equipment to be transported as the transported object by the mobile robot 20. This management information can be stored as a part or all of the equipment lending information 324 in the storage unit 32 of the equipment lending system 30, or can be stored as a part or all of the transported object information 126 in the storage unit 12 of the host management device 10.

Then, based on the management information stored in this way, the transport system 1 according to the present embodiment executes a determination process for determining whether the interval from the use end time to the next use start time is equal to or longer than a predetermined time for each lending equipment. This predetermined time can be set to, for example, a time during which maintenance of the lending equipment can be performed at the storage location when the lending equipment is transported to the storage location, but the present disclosure is not limited to this.

This determination process and control based on the determination result can be performed mainly by, for example, the host management device 10, and such an example will be given below. Alternatively, the determination process and the control can also be performed mainly by the equipment lending system 30 or the mobile robot 20.

The host management device 10 requests the equipment lending system 30 to transmit the equipment lending information 324, and executes the above-described determination process for each lending equipment based on the received equipment lending information 324. It goes without saying that, it is not necessary to execute the determination process for the lending equipment every time when this determination process is completed and a new lending schedule is not updated.

When the above-described interval is equal to or longer than the predetermined time, the host management device 10 transmits an instruction to the mobile robot 20 to transport the lending equipment, which was the determination target, to the storage location after the end of its use. At this time, the host management device 10 determines an appropriate mobile robot 20 from the plurality of mobile robots 20 that are managed. As described above, such a determination of the appropriate mobile robot 20 and determination of the route can be executed by the route planning unit 115 so that the task can be efficiently executed as the whole system. The storage location may be different for each lending equipment, and the information can be included in the equipment information 323 and used by the host management device 10 that acquires the equipment information 323. The mobile robot 20 that has received the instruction from the host management device 10 executes the transport of the lending equipment. At the storage location, user U2 can receive the lending equipment.

In this way, when the interval from the use end time of the lending equipment (time when the mobile robot 20 picks up the lending equipment) to the next use start time (scheduled use time) is equal to or longer than the predetermined time, the lending equipment is transported to the normal storage location. At the storage location, the user U2 serving as the maintenance personnel performs maintenance such as inspection, cleaning, and replacement of consumables as necessary in preparation for the next use.

In contrast, when the above-described interval is shorter than the predetermined time, the host management device 10 transmits an instruction to the mobile robot 20 to transport the lending equipment, which was the determination target, to the next use location of the equipment to be lent after the end of its use. Also at this time, the host management device 10 determines an appropriate mobile robot 20 from the plurality of mobile robots 20 that are managed. As described above, such a determination of the appropriate mobile robot 20 and determination of the route can be executed by the route planning unit 115 so that the task can be efficiently executed as the whole system. The mobile robot 20 that has received the instruction from the host management device 10 executes the transport of the lending equipment. At the next use location, the user U2 can receive the lending equipment.

In this way, when the interval from the use end time of the lending equipment (time when the mobile robot 20 picks up the lending equipment) to the next use start time (scheduled use time) is shorter than the predetermined time, the lending equipment is transported to the next use location. At the next use location, the user U2 serving as the maintenance personnel performs maintenance such as inspection, cleaning, and replacement of consumables as necessary in preparation for the next use. As a result, even when the time from the use end time to the next use start time of the lending equipment is short, the mobile robot 20 transports the lending equipment to the next use location without passing through the storage location. This makes it easier to secure time for maintenance at the next use location even when maintenance is required, and thus the lending equipment can be lent efficiently.

As described above, the host management device 10 selects the transport destination after the end of use of the lending equipment between the storage location and the next use location based on the determination result with the predetermined time as the threshold value, and causes the mobile robot 20 to execute the transport to the selected transport destination.

With the above configuration, when lending the equipment, the transport system 1 does not uniformly return the equipment to the storage location once, but only returns the equipment when there is time to spare, and transports the equipment to the next use location when there is no time to spare. Thus, according to the transport system 1 according to the present embodiment, the equipment can be used promptly even when there is no time to spare before the next scheduled use time.

Further, the predetermined time may be determined based on the moving time from the use location to the storage location and the moving time from the above use location to the next use location. In particular, the next use location may be at a long distance such as a different ward or may be at a short distance such as an operating room on the same floor. By determining the predetermined time based on the above two moving times (for example, based on the difference between the above two moving times), it is possible to lend the lending equipment appropriately and at a high operating rate.

Further, the predetermined time may be different for each lending equipment. Even when the same maintenance is performed, the storage location has a better maintenance environment and allows easier maintenance. By setting a different predetermined time for each lending equipment, the transport destination can be determined in consideration of the maintenance time at the transport destination.

Some lending equipment are attached with disposable accessories (for example, tubes, articles that come into contact with the patient or body fluids of the patient, etc.). In that case, the accessories and the like can be handled as one transported object integrally with the lending equipment. It should be noted that, when transporting to the next use location, a set of the accessories and the like prepared for the number of use locations can be handled as one transported object. Alternatively, it is possible to simultaneously transport the accessories and the like for the number of use locations as different equipment (equipment that falls out of the category of lending equipment), or to handle the accessories and the like as completely different transported objects.

Further, the transport system 1 may notify the contact information of the maintenance personnel who performs maintenance of the lending equipment of the transport destination of the lending equipment determined as a result of the above determination process. This notification may be executed by the host management device 10. However, the configuration only needs to be such that the transport system 1 can execute the notification, such as by the mobile robot 20. With such a notification, the maintenance personnel can head to the transport destination of the lending equipment for maintenance as needed.

The maintenance personnel includes clinical laboratory technicians, radiological technologists, occupational therapists, physiotherapists, clinical engineering technicians, doctors, nurses, associate nurses, and technicians from manufacturers of the lending equipment.

Further, the transport system 1 may make the notification destination for the transport destination of the lending equipment determined as a result of the above determination process different depending on the type (model) of the lending equipment. With such a notification, the maintenance personnel can be different depending on the skill level and expertise of maintenance of the equipment. Making the notification destination different depending on the type of the lending equipment means to make the maintenance personnel different depending on the type of the lending equipment.

Further, the notification destination can be set to the notification destination of a different maintenance personnel depending on whether the period from the use end time to the use start time is equal to or longer than or shorter than the predetermined time. That is, the transport system 1 may notify the transport destination of the lending equipment to the contact information of a first maintenance personnel who performs maintenance of the lending equipment, when the transport destination of the lending equipment is determined to be the storage location of the lending equipment as a result of the above determination process, and notify the transport destination of the lending equipment to the contact information of a second maintenance personnel who performs maintenance of the lending equipment and who is different from the first maintenance personnel, when the transport destination of the lending equipment is determined to be the next use location of the lending equipment as a result of the above determination process.

With such a notification, the maintenance personnel of the lending equipment can be classified into the person in charge at the storage location and the person in charge at the next use location, and it can be considered that the right person in charge can be assigned at the right place. In particular, when the transport destination is determined to be the next use location, it is possible to notify personnel who can deal with sudden problems at the site, and when the transport destination is determined to be the storage location, it is possible to notify other personnel. For example, when the above period is equal to or longer than the predetermined time, a clinical engineering technician in charge can be notified, and when the above period is shorter than the predetermined time, an equipment manager can be notified. Alternatively, when the above period is equal to or longer than the predetermined time, a maintenance personnel dedicated to the storage location can be notified, and when the above period is shorter than the predetermined time, a maintenance personnel who can deal with a sudden problem at the site can be notified.

The transport system 1 notifies the contact information of the maintenance personnel of the transport destination and the arrival time of the lending equipment, when the transport destination of the lending equipment is determined to be the next use location of the lending equipment as a result of the determination process. With such a notification, the maintenance personnel can head for maintenance as needed even when the transport destination is determined to be the next use location. Further, since the maintenance personnel can grasp the arrival time, the maintenance personnel does not have to wait at the transport destination, and by heading to the transport destination according to the arrival time, the maintenance personnel can perform the maintenance without being late for the next use start time.

Further, the transport system 1 may notify the contact information of the maintenance personnel of the transport destination and the arrival time of the lending equipment, when the transport destination of the lending equipment is determined to be the storage location of the lending equipment as a result of the determination process. With such a notification, the maintenance personnel can head for maintenance as needed even when the transport destination is determined to be the storage location. Further, since the maintenance personnel can grasp the arrival time, the maintenance personnel does not have to wait at the transport destination, and the maintenance can be performed collectively in consideration of the maintenance of other equipment.

Equipment Lending Information 324 and Transported Object Information 126

Figure 7:
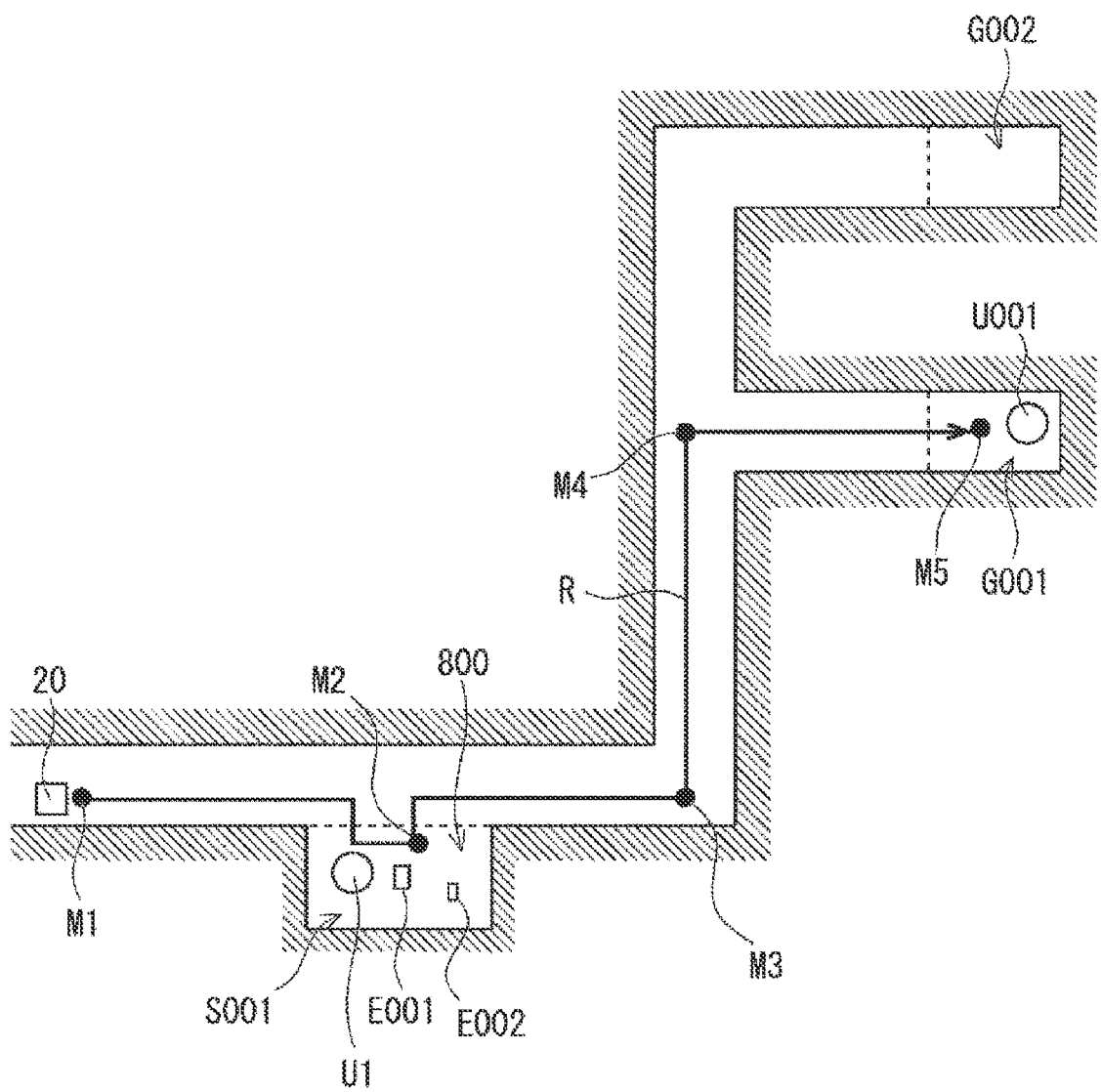
FIG. 7 is a diagram showing an example of a movement route of the mobile robot.
Figure 8:
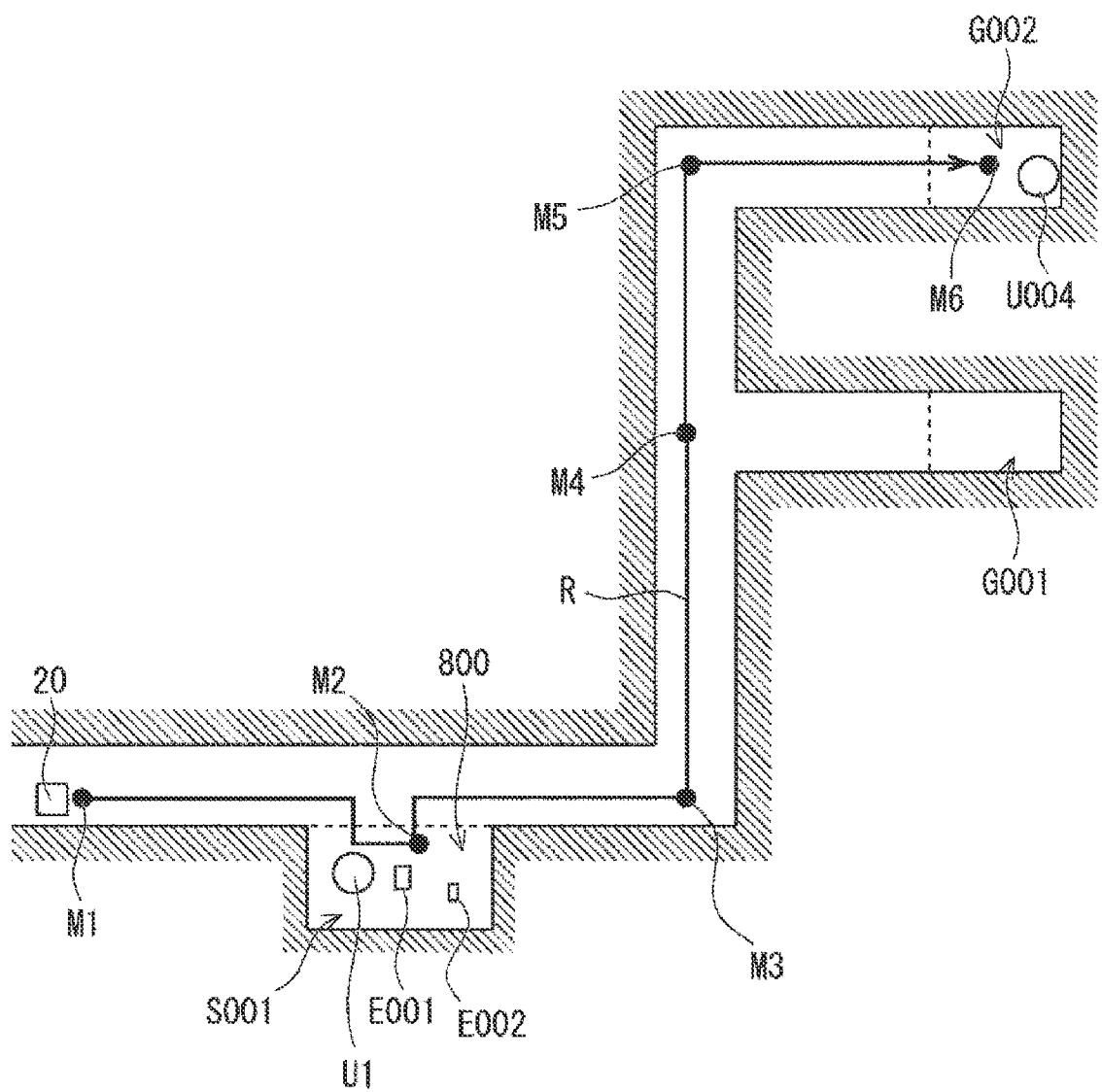
FIG. 8 is a diagram showing another example of the movement route of the mobile robot.
Figure 9:
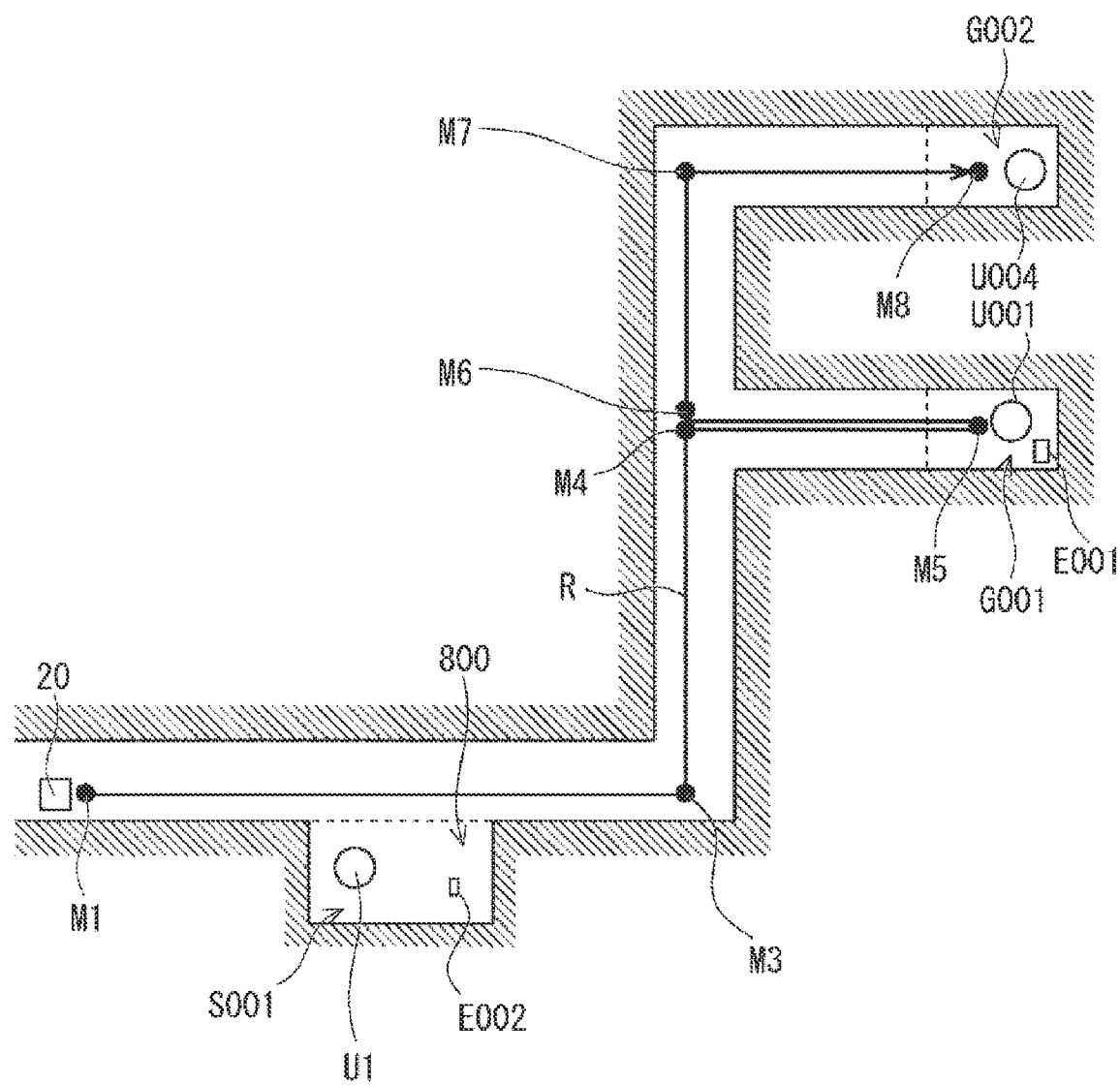
FIG. 9 is a diagram showing another example of the movement route of the mobile robot.

An example of processing of the transport system 1 according to the present embodiment will be described by exemplifying a case where the information illustrated in FIG. 5 is stored as the equipment lending information 324. FIG. 5 is a table showing an example of the equipment lending information 324, and FIG. 6 is a table showing an example of the transported object information 126. FIGS. 7 to 9 are diagrams showing examples of the movement routes of the mobile robot.

As illustrated in FIG. 5, the equipment lending information 324 can include the ID (equipment management number), a name, necessity of maintenance, a maintenance personnel type (or maintenance personnel), a transport destination, a planned user, a use start time, and a use end time of the lending equipment. As illustrated in FIG. 5, these types of information can be associated with each other by a lending management number and managed as a table.

The transport destination indicates the delivery destination (use location) of the lending equipment, and can be extracted from the lending request information together with the use start time and the use end time. The planned user indicates the person who uses the lending equipment. For example, the planned user can be the name or ID of a patient, or the name or ID of a staff member such as a nurse or a doctor. It goes without saying that the planned user may include information on both the patient and the staff member. In some embodiments, information on the necessity of maintenance can be information indicating whether maintenance is required for the lending equipment, and information on the maintenance personnel type (or maintenance personnel) can be information indicating the type of maintenance personnel (or information indicating the ID or name of the maintenance personnel) when performing maintenance.

As described above, the equipment lending information 324 is generated based on the lending request information. At this time, the equipment information 323 and the maintenance personnel information 322 are also referred to to generate the equipment lending information 324. Since the maintenance personnel type or the maintenance personnel information in the maintenance personnel information 322 and the equipment lending information 324 is required when notifying the maintenance personnel, the above information is not necessary in the case where the notification is not performed.

As illustrated in FIG. 6, the transported object information 126 can include an equipment management number, a name, necessity of maintenance, a maintenance personnel type (or maintenance personnel) indicating a notification destination, a transport source, a transport destination, a planned user, a robot ID in charge of transport, a status, a use start time, and a use end time. As illustrated in FIG. 6, these types of information can be associated with each other by a transport management number and managed as a table.

The transport source indicates the location where the mobile robot 20 loads the lending equipment. The transport destination indicates the delivery destination (use location) of the lending equipment. Although the example shows a case where the number of the storage locations serving as the transport source is one, it goes without saying that the number of the storage locations is not limited to one and the number of the transport destinations is not limited to two. The planned user indicates the person who uses the lending equipment. For example, the planned user indicates the name or ID of a patient. Alternatively, the planned user may indicate the name and ID of a staff member such as a nurse or a doctor. Needless to say, the planned user may include information on both the patient and the staff member.

As described above, the transported object information 126 is generated based on the transport request information. Thus, the transported object information 126 can be generated based on the information including the equipment lending information 324 (and information on other transported objects) and the mobile robot 20 determined in consideration of the task execution efficiency based on the equipment lending information 324. The robot ID is the ID of the mobile robot 20 in charge of transporting the lending equipment. The robot ID is set based on a route plan that takes into consideration the task execution efficiency. The status is information indicating whether it is before, during, or after transport of the lending equipment. The status is updated when the mobile robot 20 loads the lending equipment and when the receipt of the lending equipment is completed.

The transported object information 126 is transmitted to the respective mobile robots 20 in charge of transporting the lending equipment. For example, the transported object information 226 of the mobile robot 20 includes information on the lending equipment that the mobile robot 20 is in charge of transporting. That is, the transported object information of the lending equipment for the robot ID "BBB" does not have to be transmitted to the mobile robot 20 having the robot ID "AAA".

The transport of the lending equipment E001 in FIGS. 5 and 6 will be described with reference to FIGS. 7 to 9. In FIGS. 5 and 6, the time is displayed based on the current day for convenience, but time display is actually managed by the date and time (year, month, day, and time). This is because some equipment can be lent for days or months, for example. Normally, since the transport is started from a storage location S001, FIG. 6 shows an example in which such a route is set. The route itself is determined by the route planning unit 115 as described above, and is set in the corresponding mobile robot 20.

For the transport management number 001, as shown in FIG. 7, the mobile robot 20 (robot ID: AAA) first moves from the passing point M1 indicating the current point to the passing point M2 that is the storage location 800 of the lending equipment E001. After that, the mobile robot 20 receives the lending equipment E001 at the storage location 800, then moves in order through the passing points M3 and M4 along a route R heading to the transport destination G001 (M5). At the transport destination G001, the planned user U001 receives the lending equipment E001. After that, the mobile robot 20 can move as needed for other tasks.

The lending equipment E001 will be used at the transport destination G001 until the use end time of 15:30. After that, the lending equipment E001 will be transported to the transport destination G002 in time for the use start time of 16:00 according to the transport management number 003, but there is only 30 minutes to spare.

When the predetermined time is set to 20 minutes, the transport destination of the lending equipment E001 is set by the determination process so that the lending equipment E001 is returned to the storage location 800 after the end of use after the transport corresponding to the transport management number 001. Such a transport destination is notified to the notification destination of the maintenance personnel type MA001 together with the arrival time. In this case, the transport source of the transport management number 002 is S001, and the route R that passes through the passing points M1, M2, M3, M4, M5, and M6 is set as shown in FIG. 8. However, here, the example shows a case where, after the delivery of the transport management number 001, the mobile robot 20 having the robot ID AAA is returned to the original position (M1) by the transport (referred to as the transport V) not shown in FIG. 6. In this case, the transport destination of the transport V is notified to the notification destination of the maintenance personnel type (for example, MA001 which is the same as that of the transport management number 001) together with the arrival time.

However, there may be a case where the maintenance cannot be performed in time at the storage location 800 as shown in the route R in FIG. 8 with only a margin of 30 minutes. In this case, for example, when the predetermined time is set to 40 minutes and the above determination process is executed, the above transport V (not shown in FIG. 6) is deleted so that the lending equipment E001 remains in the G001 even after use, and the transport source of the transport management number 002 will be changed from S001 to G001. That is, since there is not enough time before the desired arrival time at the transport destination G002, the transport V is deleted so that the lending equipment E001 is directly transported to the transport destination G002, and thus the transport source of the transport management number 003 will also be changed from S001 to G001.

With such a setting of the transport source, the mobile robot 20 (robot ID AAA or possibly another robot) moves through the passing points M1, M3, and M4 in order as shown in the route R in FIG. 9, and will reach G001 (M5) where the lending equipment E001 is present. In G001, the lending equipment E001 is loaded into the mobile robot 20 by the previous planned user U001 or the like. Next, the mobile robot 20 moves through the passing points M6 and M7 in order, and reaches the transport destination G002 (M8) in time for the use start time of 16:00. At the transport destination G002, the planned user U004 receives the lending equipment E001. When the route R shown in FIG. 9 is determined, the transport destination G002 is notified to the notification destination of the maintenance personnel type MA001 together with the arrival time.

It should be noted that, here, the example shows a case where the mobile robot 20 having the robot ID AAA returns to the original position (M1) after the delivery of the transport management number 001. After the lending equipment E001 is unloaded at the transport destination G002, the mobile robot 20 can move as needed for other tasks.

For the transport management number 005, the mobile robot 20 (robot ID: BBB) is set to a route in the direction opposite to the route R shown in FIG. 8. Assuming that the position at this point is the passing point M6 for simplification, the mobile robot 20 moves through the passing points M5, M4, and M3 from there. After that, on the way, the lending equipment E001 is unloaded at the transport destination S001 (passing point M2), and the mobile robot 20 arrives at the passing point M1. Also for the transport management number 005, when the route is decided, the transport destination S001 is notified to the notification destination of the maintenance personnel type MA001 together with the arrival time. Since the transport management number 005 is transport for returning the lending equipment E001 to the storage location, the scheduled return time is set as the use start time, the same time is set as the use end time, and the planned user is not set.

For the transport management number 006, similarly to the route R shown in FIG. 7, the mobile robot 20 (robot ID: BBB) moves from the passing point M1 indicating the current point, and on the way, loads the lending equipment E001 at the passing point M2, moves through the passing points M3, M4, and M5, and arrives at the transport destination G001.

The time from the use end time of 18:30 of the lending equipment E001 for the transport management number 003 to the use start time of 22:00 of the lending equipment E001 for the transport management number 006 is equal to or longer than the predetermined time (40 minutes). Therefore, by the above determination process, the route is determined so that, after the use of the lending equipment E001 for the transport management number 003 is completed, the transport for the transport management number 005 is executed, and the lending equipment E001 is transported to the storage location 800. The maintenance personnel is notified and the transport is executed. Since the lending equipment E001 is located at the storage location 800, the transport source of the transport management number 006 is S001. Also for the transport management number 006, when the route R is decided, the transport destination G001 is notified to the notification destination of the maintenance personnel type MA001 together with the arrival time.

Next, the same applies to the transport of the lending equipment E002 in FIGS. 5 and 6. For example, the lending equipment E002 first heads to the transport destination G001 for the transport management number 002, and after the lending equipment E002 is used, once returns to the storage location S001 because there is a margin before the desired arrival time at G002. For the transport management number 004, the lending equipment E002 is transported from the transport source S001 to the transport destination G002. However, since the necessity of maintenance is set to "optional" for both the transport management numbers 002 and 004, it is possible not to notify the maintenance personnel, and the predetermined time can be set to a time longer than that of the lending equipment E001.

Transport Method

Figure 10:
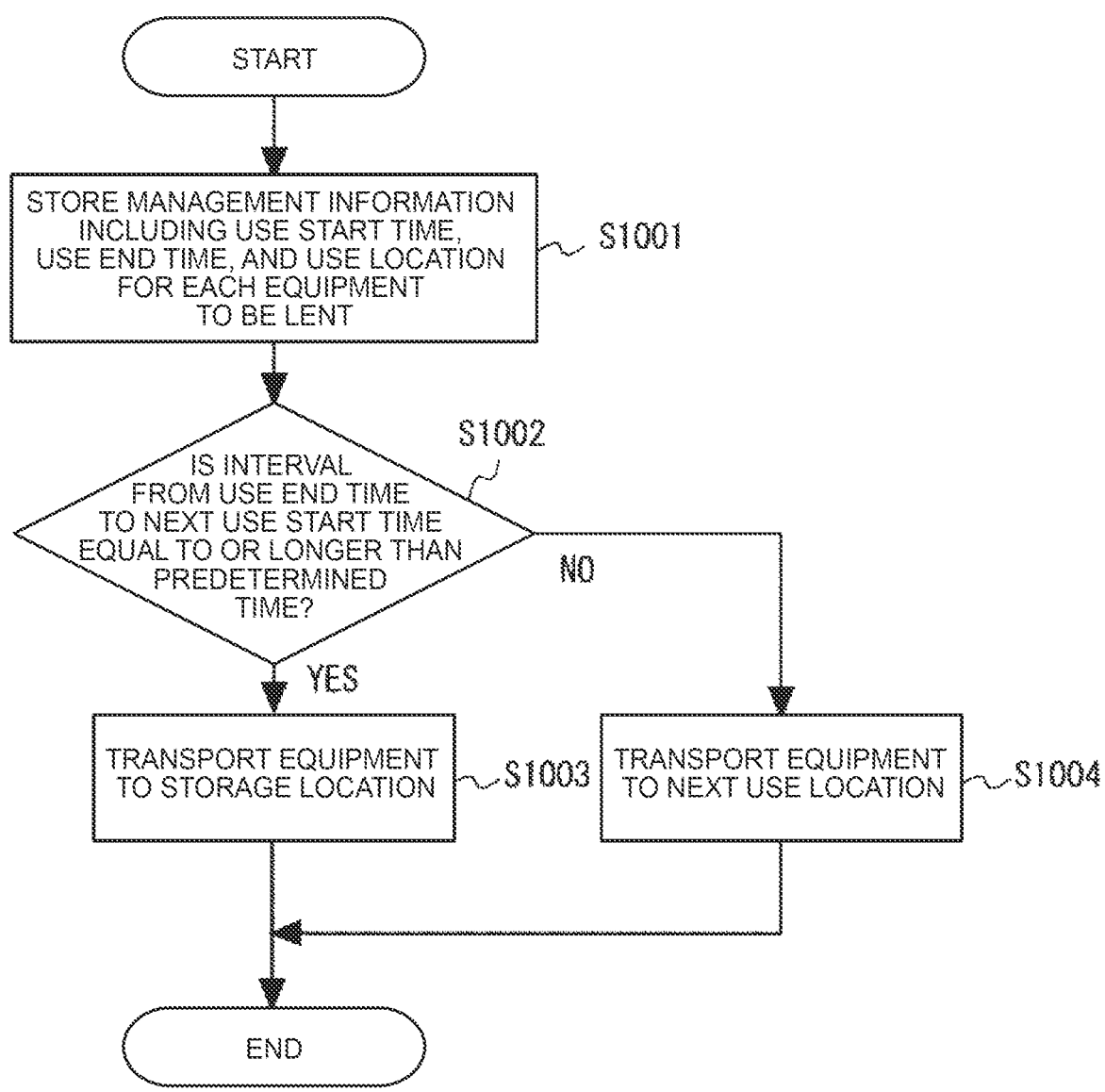
FIG. 10 is a flowchart showing a transport method according to the present embodiment.

FIG. 10 is a flowchart showing a transport method according to the present embodiment. First, the host management device 10 or the equipment lending system 30 stores the management information including the use start time, the use end time, and the use location for each equipment to be lent that is transported as the transported object by the mobile robot 20 (S1001).

Next, the host management device 10 or the equipment lending system 30 executes the determination process of determining whether the interval from the use end time to the next use start time is equal to or longer than the predetermined time for each equipment, based on the above management information (S1002).

When the interval is equal to or longer than the predetermined time (YES in S1002), the host management device 10 causes the mobile robot 20 to transport the equipment to its storage location after the end of use of the equipment (S1003), and ends the process. When the interval is shorter than the predetermined time (NO in S1002), the host management device 10 causes the mobile robot 20 to transport the equipment to its next use location after the end of use of the equipment (S1004), and ends the process.

A part or all of the processing in the host management device 10, the mobile robot 20, the equipment lending system 30, and the like described above can be realized as a computer program. Such a program can be stored using various types of non-transitory computer-readable media and supplied to a computer. The non-transitory computer-readable media include various types of tangible recording media. Examples of the non-transitory computer-readable media include magnetic recording media (e.g. flexible disks, magnetic tapes, hard disk drives), magneto-optical recording media (e.g. magneto-optical disks), compact disc read-only memory (CD-ROM), compact disc recordable (CD-R), compact disc rewritable (CD-R/W), and semiconductor memory (e.g. mask ROM, programmable ROM (PROM), erasable PROM (EPROM), flash ROM, random access memory (RAM)). The program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The present disclosure is not limited to the above embodiment, and can be appropriately modified without departing from the spirit.

For example, in the above embodiment, a system in which a mobile robot autonomously moves in a hospital has been mainly described, but the above-described transport system can transport an article including equipment to be lent in a hotel, a restaurant, an office building, an event venue, or a complex facility as luggage. Further, although the description has been made on the premise that the equipment is transported within one facility, when the mobile robot is a mobile robot that can move between a plurality of facilities, the disclosure can be similarly applied to the transport between a plurality of facilities. In addition, examples of the maintenance personnel were described as clinical engineering technicians, nurses, and the like, but these names differ depending on the country, and the classification and the equipment that can be handled by the personnel of each classification also differ.

Further, the transport system according to the present embodiment is not limited to the case where the mobile robot 20 having the above-described configuration is used, and instead of or in addition to the mobile robot 20, mobile robots having various configurations can be used. An example of such a mobile robot will be described with reference to FIGS. 11 and 12.

Figure 11:
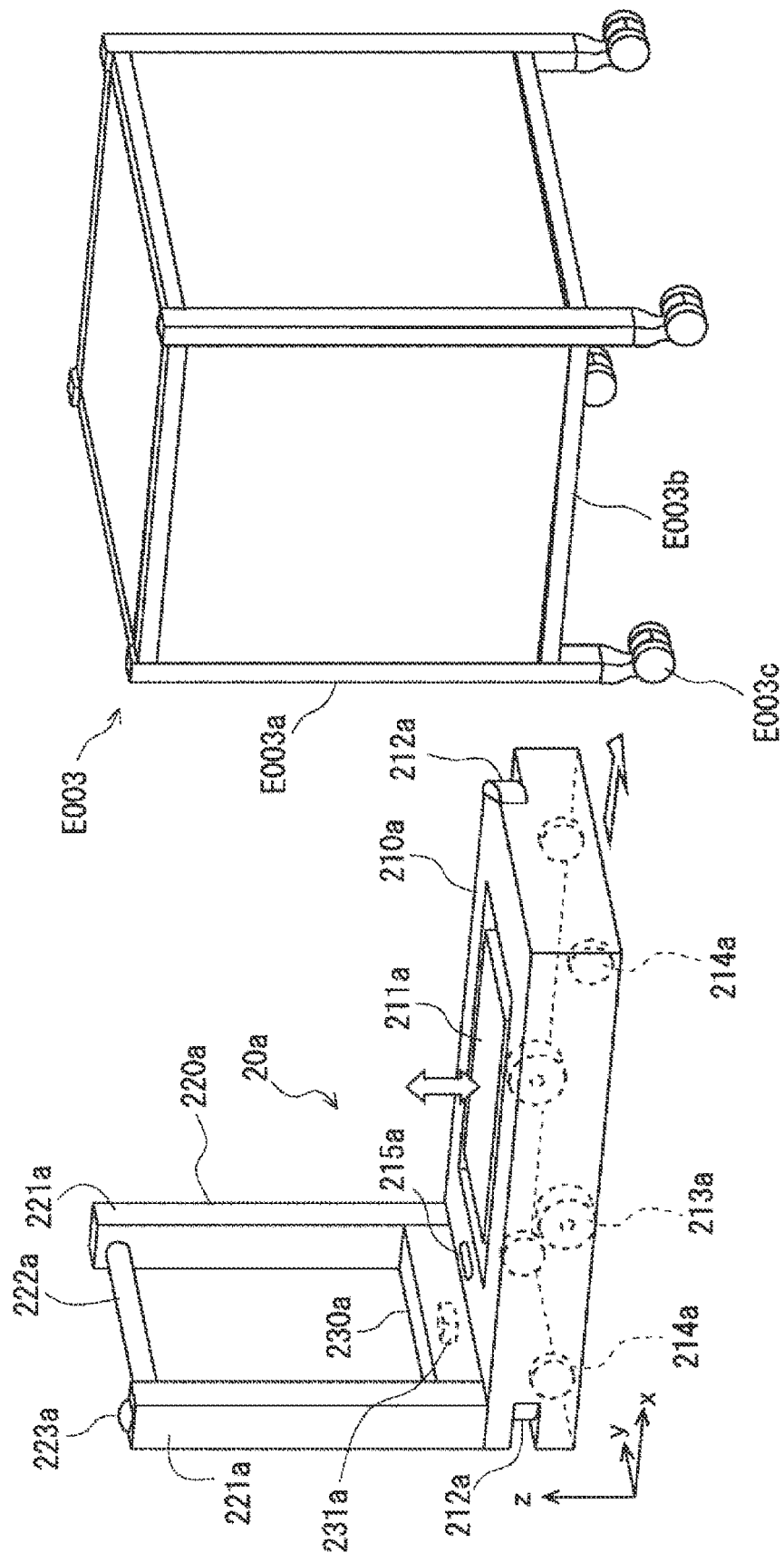
FIG. 11 is a schematic view showing another example of the mobile robot together with an example of lending equipment.

FIG. 11 is a schematic view showing another example of the mobile robot together with an example of the lending equipment. A transport robot 20a illustrated in FIG. 11 is a robot for transporting large lending equipment E003. For convenience in describing the positional relationship of the components, a right-handed Cartesian coordinate system is indicated in FIG. 11.

The lending equipment E003 constitutes a quadrangular prism-shaped frame by connecting a plurality of frames E003a, and casters E003c are provided at the four corners of the bottom surface portion. A bottom plate E003b is provided parallel to the floor surface at a preset height from the bottom surface portion. The height from the floor surface to the lower surface of the bottom plate E003b is secured so that a main body block 210a of the transport robot 20a can enter the space between the floor surface and the lower surface of the bottom plate E003b. The contact surface of the transport robot 20a comes into contact with the lower surface of the bottom plate E003b.

The transport robot 20a is an autonomous mobile robot that moves on the floor surface of a hospital. The transport robot 20a transports large equipment as schematically illustrated by the lending equipment E003 from a predetermined position (starting point) to another position (destination). The transport robot 20a has the main body block 210a, a handle block 220a, and a control block 230a as main configurations. As the lending equipment E003, various examples such as an electrocardiogram monitor (bedside monitor) can be given.

The main body block 210a has a flat rectangular parallelepiped shape in which the main surface is grounded. The height of the main surface of the main body block 210a is set so that the main body block 210a can enter the lower portion of the lending equipment E003. Thus, the main body block 210a enters the lower portion of the lending equipment E003 to lift the lending equipment E003 from below. The main body block 210a has an elevating portion 211a, distance measuring sensors 212a, drive wheels 213a, driven wheels 214a, and a speaker 215a as main configurations.

The elevating portion 211a is a flat plate-shaped component provided at the center of the upper surface of the main body block 210a, and has a substantially smooth contact surface on the upper side (z-axis positive side). The contact surface is provided so as to be parallel to the floor surface (x-y surface) and face upward. An elevating mechanism (not shown) for elevating the elevating portion 211a is provided below the elevating portion 211a. The elevating mechanism allows the contact surface of the elevating portion 211a to move up and down and stop at a preset position. In this way, the elevating portion 211a is configured to come into contact with the lower portion of the lending equipment E003, lift the lending equipment E003 parallel to the floor surface, and hold the lending equipment E003.

The distance measuring sensor 212a is a sensor capable of detecting the transport robot 20a and an object around the transport robot 20a, and measuring the distance between the detected object. The distance measuring sensor 212a detects the relative position between the transport robot 20a and a surrounding object by, for example, infrared rays, laser light, or millimeter waves. The distance measuring sensor 212a may be called as an object sensor. Each distance measuring sensor 212a is provided in the front portion and the rear portion of the main body block 210. Thus, the distance measuring sensors 212a can detect obstacles in any movement direction of the transport robot 20a.

The transport robot 20a sets a safe distance for the distance from the obstacle detected by the distance measuring sensor 212a. The transport robot 20a controls the autonomous movement of the transport robot 20a so that the obstacle is located farther than the safe distance. Further, when the obstacle is located closer than the safe distance, the transport robot 20a temporarily stops the movement of the transport robot 20a or issues a warning for the obstacle.

The drive wheels 213a come in contact with the floor surface to support the main body block 210a and move the main body block 210a. The main body block 210a has two drive wheels 213a axially supported on one rotation axis extending in the right-left direction (y-axis direction) at the center of the main body block 210a in the front-rear direction (x-axis direction) of the transport robot 20a so as to be separated from each other. The two drive wheels 213a are configured to be independently rotatable about the rotation axis. The transport robot 20a moves forward or rearward by driving the drive wheels 213a disposed on the right and left sides at the same rotation speed, and makes a turn by generating a difference in the rotation speed or rotation direction between the right and left drive wheels 213a.

The driven wheels 214a come in contact with the floor surface to support the main body block 210a and freely rotates in accordance with the movement of the drive wheels 213a. The main body block 210a has driven wheels 214a in each of the front direction and the rear direction of the drive wheels 213a. That is, the main body block 210a has a driven wheel 214a at each of the four corners of the rectangular contact surface.

The speaker 215a is for transmitting a preset voice. The speaker 215a is provided so that the transmitted voice can be recognized by a passerby or the like that is present around the transport robot 20a. Thus, the transport robot 20a can issue warning such as calling attention to the presence of the transport robot 20a to a passerby or the like via the speaker 215a.

The handle block 220a is used when a user manually tows the transport robot 20a. The handle block 220a has two columnar members 221a erected in parallel on the upper surface and the rear end portion of the main body block 210a so as to be separated from each other in the right-left direction, and a grip portion 222a for suspending the upper end portions of the two columnar members 221a. A stop button 223a is provided at the upper end portion of one of the two columnar members 221a. When the stop button 223a is pressed, the transport robot 20a stops the autonomous movement.

The control block 230a includes a CPU, a circuit, and the like for controlling the drive of the transport robot 20a. The control block 230a is installed at a desired position of the transport robot 20a and controls the transport robot 20a according to an instruction received from the user terminal 400. Further, the control block 230a appropriately transmits the information acquired from the sensor or the like of the transport robot 20a to the user terminal 400.

The transport robot 20a has a posture sensor 231a. The posture sensor 231a is fixed at a desired position of the transport robot 20a, and is a six-axis sensor that detects the acceleration in each axis direction of three orthogonal axes and the angular velocity around each axis to detect changes in the posture of the transport robot 20a. For example, when the transport robot 20a passes through a slope, the posture sensor 231a detects the inclination of the transport robot 20a caused by the inclination of the floor surface.

Figure 12:
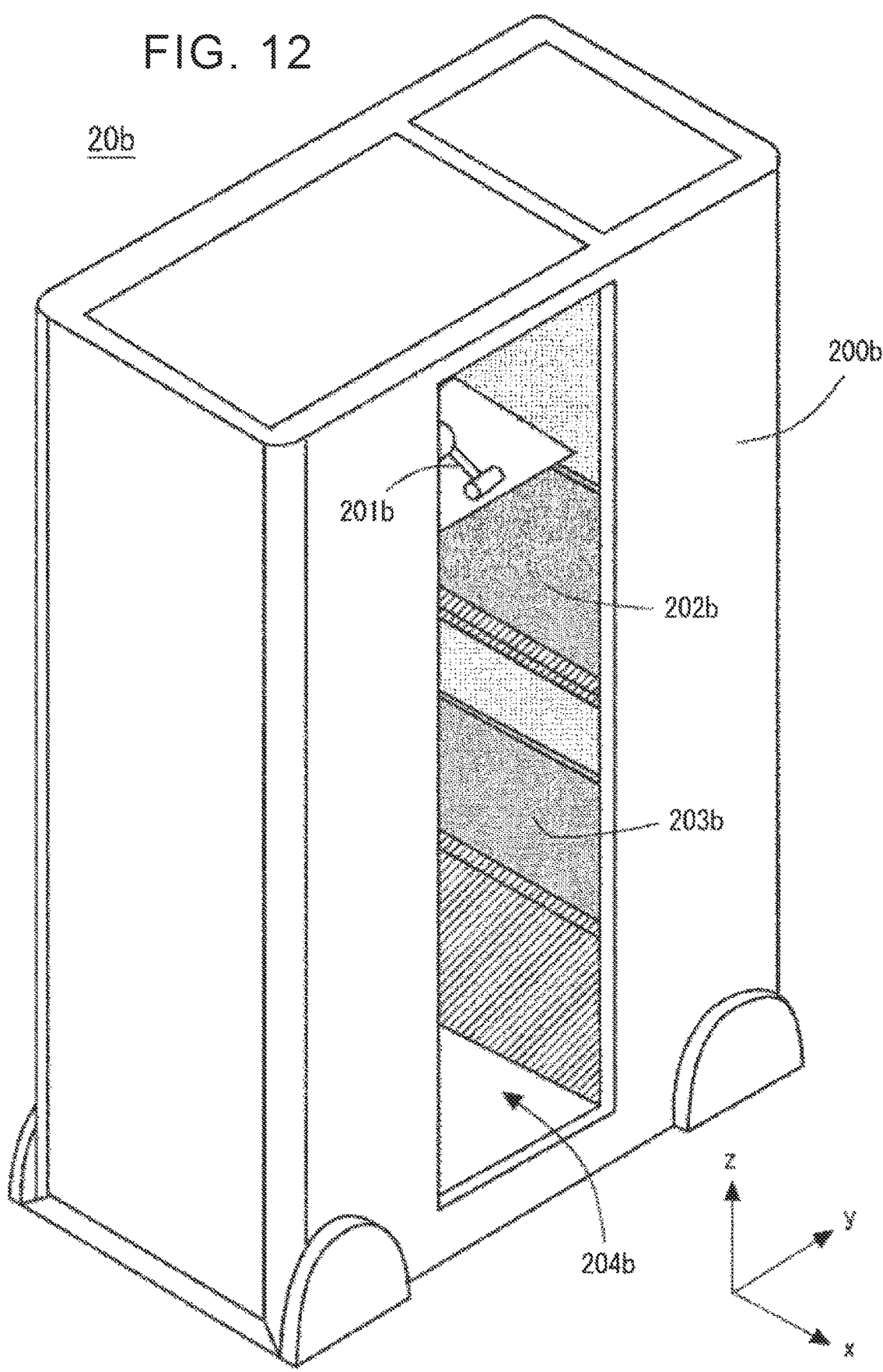
FIG. 12 is a schematic view showing another example of the mobile robot.

FIG. 12 is a schematic view showing another example of the mobile robot. Also in FIG. 12, a right-handed Cartesian coordinate system is indicated. A mobile robot 20b illustrated in FIG. 12 is configured such that a housing (not shown) is covered with a safety cover 200b. Wheels are provided in the lower portion of the housing, and a drive unit for driving the wheels is also installed in the housing.

As shown in FIG. 12, the mobile robot 20b has a substantially rectangular shape when viewed from above. In the mobile robot 20b, the surface in the x direction faces the shelf surface that is the object loading/unloading surface of the shelf. An arm opening 204b is provided on one surface in the x direction.

A robot arm 201b is attached to the housing covered by the safety cover 200b. The robot arm 201b moves its arm in and out from the arm opening 204b provided on a predetermined surface of the safety cover 200b to pick up an object to be stored on a shelf (not shown) and store the object in storage boxes 202b and 203b. The storage boxes 202b and 203b are placed in the housing inside the safety cover 200b. The storage boxes 202b and 203b can be taken in and out by a worker, a mechanism of the mobile robot 20b, or the like. In addition, although description and illustration are omitted, the mobile robot 20b may be provided with various functions as illustrated in FIG. 4.

What is claimed is:

1. A transport method for transporting a transported object using a mobile robot that is autonomously moveable, the transport method comprising:
   storing management information including a use start time, a use end time, and a use location for each equipment to be lent that is transported as the transported object by the mobile robot;
   executing a determination process for determining whether an interval from the use end time to a next use start time is equal to or longer than a predetermined time for each equipment based on the management information;
   transporting the equipment to a storage location of the equipment after an end of use of the equipment when the interval is equal to or longer than the predetermined time;
   transporting the equipment to a next use location of the equipment after the end of the use of the equipment when the interval is shorter than the predetermined time;
   notifying contact information of a maintenance personnel who performs maintenance of the equipment of a transport destination of the equipment determined as a result of the determination process;
   notifying contact information of a first maintenance personnel who performs maintenance of the equipment of the transport destination of the equipment, when the transport destination of the equipment is determined to be the storage location of the equipment as a result of the determination process; and
   notifying contact information of a second maintenance personnel who performs maintenance of the equipment and who is different from the first maintenance personnel of the transport destination of the equipment, when the transport destination of the equipment is determined to be the next use location of the equipment as a result of the determination process,
   wherein the predetermined time is determined based on a moving time of the mobile robot from the use location to the storage location and a moving time of the mobile robot from the use location to the next use location.

2. The transport method according to claim 1, further comprising making a notification destination for the transport destination of the equipment determined as a result of the determination process different depending on a kind of the equipment.

3. A transport system for transporting a transported object using a mobile robot that is autonomously moveable, wherein:
   the transport system stores management information including a use start time, a use end time, and a use location for each equipment to be lent that is transported as the transported object by the mobile robot;
   the transport system executes a determination process for determining whether an interval from the use end time to a next use start time is equal to or longer than a predetermined time for each equipment based on the management information;
   the transport system transports the equipment to a storage location of the equipment after an end of use of the equipment when the interval is equal to or longer than the predetermined time;
   the transport system transports the equipment to a next use location of the equipment after the end of the use of the equipment when the interval is shorter than the predetermined time
   the transport system notifies contact information of a maintenance personnel who performs maintenance of the equipment of a transport destination of the equipment determined as a result of the determination process;
   the transport system notifies contact information of a first maintenance personnel who performs maintenance of the equipment of the transport destination of the equipment, when the transport destination of the equipment is determined to be the storage location of the equipment as a result of the determination process; and
   the transport system notifies contact information of a second maintenance personnel who performs maintenance of the equipment and who is different from the first maintenance personnel of the transport destination of the equipment, when the transport destination of the equipment is determined to be the next use location of the equipment as a result of the determination process, wherein the predetermined time is determined based on a moving time of the mobile robot from the use location to the storage location and a moving time of the mobile robot from the use location to the next use location.

4. The transport system according to claim 3, wherein the transport system makes a notification destination for the transport destination of the equipment determined as a result of the determination process different depending on a kind of the equipment.

5. A non-transitory storage medium configured to cause a computer to execute transport management for transporting a transported object using a mobile robot that is autonomously moveable, wherein the transport management includes:

storing management information including a use start time, a use end time, and a use location for each equipment to be lent that is transported as the transported object by the mobile robot;

executing a determination process for determining whether an interval from the use end time to a next use start time is equal to or longer than a predetermined time for each equipment based on the management information;

transporting the equipment to a storage location of the equipment after an end of use of the equipment when the interval is equal to or longer than the predetermined time; and transporting the equipment to a next use location of the equipment after the end of the use of the equipment when the interval is shorter than the predetermined time, wherein the predetermined time is determined based on a moving time of the mobile robot from the use location to the storage location and a moving time of the mobile robot from the use location to the next use location, and the transport management includes a notification process for notifying contact information of a maintenance personnel who performs maintenance of the equipment of a transport destination of the equipment determined as a result of the determination process, the notification process:

notifies contact information of a first maintenance personnel who performs maintenance of the equipment of the transport destination of the equipment, when the transport destination of the equipment is determined to be the storage location of the equipment as a result of the determination process, and notifies contact information of a second maintenance personnel who performs maintenance of the equipment and who is different from the first maintenance personnel of the transport destination of the equipment, when the transport destination of the equipment is determined to be the next use location of the equipment as a result of the determination process.

6. The non-transitory storage medium according to claim 5, wherein the notification process makes a notification destination for the transport destination of the equipment determined as a result of the determination process different depending on a kind of the equipment.

* * * * *